(12) United States Patent
Kewitsch et al.

(10) Patent No.: US 6,169,830 B1
(45) Date of Patent: Jan. 2, 2001

(54) METHODS OF FABRICATING GRATING ASSISTED COUPLER DEVICES

(75) Inventors: Anthony S. Kewitsch; George A. Rakuljic; Doruk Engin, all of Santa Monica; Seth J. Greenberg, Los Angeles; Phil A. Willems, Pasedena; Xiaolin Tong, Los Angeles, all of CA (US)

(73) Assignee: Arroyo Optics, Inc., Santa Monica, CA (US)

( * ) Notice: Under 35 U.S.C. 154(b), the term of this patent shall be extended for 0 days.

(21) Appl. No.: 09/128,476

(22) Filed: Aug. 4, 1998

Related U.S. Application Data

(63) Continuation-in-part of application No. 08/703,357, filed on Aug. 26, 1996, now Pat. No. 5,805,751, and a continuation-in-part of application No. 08/738,068, filed on Oct. 25, 1996, now Pat. No. 5,875,272.
(60) Provisional application No. 60/055,157, filed on Aug. 4, 1997.

(51) Int. Cl.[7] ................................................. G02B 6/34
(52) U.S. Cl. ................................................. 385/37; 385/43
(58) Field of Search .............................. 385/31, 37, 39, 385/43, 50

(56) References Cited

U.S. PATENT DOCUMENTS

| | | | |
|---|---|---|---|
| 4,474,427 | 10/1984 | Hill et al. | 385/123 |
| 4,725,110 | 2/1988 | Glenn et al. | 359/3 |

(List continued on next page.)

FOREIGN PATENT DOCUMENTS

| | | |
|---|---|---|
| WO89/12243 | 12/1989 | (WO) . |
| WO95/14946 | 6/1995 | (WO) . |

OTHER PUBLICATIONS

"Intrinsic Apodization of Bragg Gratings Written Using UV–pulse interferometry", P.Y. Cortès, F. Ouellette & S. LaRochelle, Electronics Letters, vol. 34, No. 4, pp. 396–397. (Feb. 1998).

(List continued on next page.)

Primary Examiner—John D. Lee
(74) Attorney, Agent, or Firm—Jones, Tullar & Cooper, P.C.

(57) ABSTRACT

Advantageous methodologies are disclosed for embedding periodic patterns in optical waveguide elements such as optical fibers. Polarization independence in an elongated waist region of an add/drop coupler can be established by measuring polarization characteristics during fusion and elongation, and controlling the elongation to impart a cross-sectional shape, such as a hybrid dumbbell-ellipsoid. Polarization dependence can also be minimized by angular deformation of the elements along the light transmissive axis. To write a pattern, an element having potential photosensitivity is markedly photosensitized in a hydrogen or deuterium environment pressurized to about 1000 to 5000 psi and a scanning UV beam that is transmitted through a photo mask and impinges on the coupler waist as the in-diffused gas is constantly replenished. Dimensional variations in the element which can affect spectral bandwidth are sensed by writing a preliminary test pattern in the element and then locally measuring the spectral properties of the test pattern and adjusting the local levels of background index of refractions so that the modal index of refraction is substantially constant along the length of the pattern. A relatively wide scanning writing beam tracks on a narrower waveguide element despite positional imprecision and temporal shifting by using a feedback signal derived from fluorescence induced in the element. To apodize the grating in accordance with a selected function, a constant power beam is directed through a rotating half-wave plate and divided by a polarizing beam splitter into two beams having oppositely varying DC amplitude characteristics. The two beams are separately varied to produce the desired apodization profile of the grating.

26 Claims, 7 Drawing Sheets

U.S. PATENT DOCUMENTS

| | | | |
|---|---|---|---|
| 4,737,007 | 4/1988 | Alferness et al. | 385/30 |
| 4,798,436 * | 1/1989 | Mortimore | 385/43 |
| 4,807,950 | 2/1989 | Glenn et al. | 385/123 |
| 4,900,119 | 2/1990 | Hill et al. | 385/27 |
| 5,007,705 | 4/1991 | Morey et al. | 385/12 |
| 5,016,967 | 5/1991 | Meltz et al. | 385/37 |
| 5,104,209 | 4/1992 | Hill et al. | 385/37 |
| 5,157,747 | 10/1992 | Atkins et al. | 385/37 |
| 5,187,760 | 2/1993 | Huber | 385/37 |
| 5,216,739 | 6/1993 | Hill et al. | 385/123 |
| 5,218,655 | 6/1993 | Mizrahi | 385/39 |
| 5,235,659 | 8/1993 | Atkins et al. | 385/124 |
| 5,271,024 | 12/1993 | Huber | 372/6 |
| 5,283,686 | 2/1994 | Huber | 359/337 |
| 5,287,427 | 2/1994 | Atkins et al. | 385/124 |
| 5,309,260 | 5/1994 | Mizrahi et al. | 359/3 |
| 5,327,515 | 7/1994 | Anderson et al. | 385/123 |
| 5,337,382 | 8/1994 | Mizrahi | 385/37 |
| 5,351,321 | 9/1994 | Snitzer et al. | 385/10 |
| 5,363,239 | 11/1994 | Mizrahi et al. | 359/570 |
| 5,367,588 | 11/1994 | Hill et al. | 385/37 |
| 5,377,288 | 12/1994 | Kashyap et al. | 385/37 |
| 5,400,166 | 3/1995 | Huber | 359/173 |
| 5,416,866 | 5/1995 | Sehlén | 385/37 |
| 5,420,948 | 5/1995 | Byron | 385/37 |
| 5,425,116 | 6/1995 | Dragone et al. | 385/24 |
| 5,444,803 | 8/1995 | Kim et al. | 385/28 |
| 5,450,511 | 9/1995 | Dragone | 385/37 |
| 5,457,758 | 10/1995 | Snitzer | 385/30 |
| 5,459,801 | 10/1995 | Snitzer | 385/30 |
| 5,495,548 | 2/1996 | Bilodeau et al. | 385/123 |
| 5,506,925 | 4/1996 | Greene et al. | 385/129 |
| 5,517,589 | 5/1996 | Takeuchi | 385/24 |
| 5,574,807 | 11/1996 | Snitzer | 385/24 |
| 5,581,642 | 12/1996 | Deacon et al. | 385/15 |
| 5,627,933 | 5/1997 | Ito et al. | 385/123 |
| 5,633,965 | 5/1997 | Bricheno et al. | 385/37 |
| 5,790,726 | 8/1998 | Ito et al. | 385/37 |
| 5,805,751 * | 9/1998 | Kewitsch et al. | 385/43 |
| 5,818,987 * | 10/1998 | Bakhti et al. | 385/37 X |
| 5,875,272 * | 2/1999 | Kewitsch et al. | 385/37 |
| 5,937,115 * | 8/1999 | Domash | 385/37 X |

OTHER PUBLICATIONS

M.S. Yataki, et al., "All–Fibre Wavelength Filters Using Concatenated Fused–Taper Couplers", Elect. Ltrs., vol. 21, No.6, Mar. 1985, pp. 248–249.

M.C. Farries, et al., "Very Broad Reflection Bandwidth (44nm) Chirped Fibre Gratings & Narrow Bandpass Filters Produced by the Use of an Amplitude Mask", Elect. Ltrs., vol. 30, No. 11, May 1994, pp. 891–892.

Victor Mizrahi, et al., "Optical Properties of Photosensitive Fiber Phase Gratings", J. Of Lightwave Tech., vol. 11, No. 10, Oct. 1993, pp. 1513–1517.

R.M. Atkins, et al., "Mechanisms of Enhanced UV Photosensitivity Via Hydrogen Loading in Germanosilicate Glasses", IEE 1993, May 11, 1993. (2 pp).

B. Malo et al., "Point–by–Point Fabrication of Micro–Bragg Gratings in Photosensitive Fibre Using Single Excimer Pulse Refractive Index Modification Techniques", Elect. Ltrs., vol. 29, No. 18, Sep. 2, 1993, pp. 1668–1669.

Francois Ouellette, et al., "Enhancement of Second–Harmonic Generation in Optical Fibers by A Hydrogen & Heat Treatment", Appl. Phys. Lett. 54(12), Mar. 20, 1989, pp. 1086–1088.

P.J. Lemaire, et al., "High Pressure H2 Loading as A Technique for Achieving Ultrahigh UV Photosensitivity & Thermal Sensitivity in GeO2 Doped Optical Fibers", IEE 1993, Apr. 23, 1993, pp. 1191–1193.

K.O. Hill, et al., "Photosensitivity in Optical Fibers", Ann Rev. Mater Sci. 1993, 125–157.

T.A. Birks, et al., "2x2 Single–Mode Fiber Routing Switch", Optics Ltrs., vol. 21, No. 10, May 1996, pp. 722–724.

T.A. Birks, et al., "Low Power Acousto–Optic Device Based on a Tapered Single–Mode Fiber", IEEE Photon. Tech. Ltrs., vol. 6, No. 6, Jun. 1994, pp. 725–727.

D.O. Culverhouse et al., "Four Port Fused Taper Acousto–Optic Devices Using Standard Singlemode Telecommunications Fibre", Elect. Ltrs., vol. 31, No. 15 Jul. 1995, pp. 1279–1280.

T.A. Birks, et al., "Four–Port Fiber Frequency Shifter With a Null Taper Coupler", Optics Ltrs., vol. 19, No. 23, Dec. 1994, pp. 1964–1966.

T.A. Birks, et al., "All–Fiber Polarizer Based on a Null Taper Coupler", Optics Ltrs., vol. 20, No. 12, Jun. 1995, pp. 1371–1373.

L. Dong, et al., "Single Pulse Bragg Gratings Written During Fibre Drawing", Elect. Ltrs., vol. 29, No. 17, Aug. 1993, pp. 1577–1578.

F. Bilodeau, et al., "Photosensitization of Optical Fiber & Silica–on–Silicon/Silica Waveguides", Optics Ltrs., vol. 18, No. 12, Jun. 1993, pp. 953–955.

Paul J. Lemaire, "Reliability of Optical Fibers Exposed to Hydrogen: Prediction of Long–Term Loss Increases", Optic Eng., vol. 30, No. 6, Jun. 1991, pp. 780–789.

Y, Inoue, et al., "Silica–Based Arrayed–Waveguide Grating Circuit as Optical Splitter/Router", IEEE, Mar. 1995, 2 pp.

J.L. Archambault et al., "Grating–frustrated coupler: a novel channel–dropping filter in single–mode optical fiber", Optics Letters, vol. 19, No. 3, Feb. 1, 1994, pp. 180–182.

F. Ouellette et al., "Permanent photoinduced birefringence in a Ge–doped fiber", Applied Physics Letters, vol. 58, No. 17, Apr. 29, 1991, pp. 1813–1815.

S.G. Farwell, "2x2 Fused Fiber Null Couplers with Asymmetric Waist Cross Sections for Polarization Independent (<0.01 dB) Switching", Journal of Lightwave Technology, vol. 16, No. 9, Sep. 1998, pp 1671–1679.

F. Bakhti et al., "Optical Add/Drop Multiplexer Based on UV–Written Bragg Grating in a Fused 100% Coupler", Elect. Ltrs., vol. 33, 1997, pp. 803–804.

T.A. Birks, "Twist–induced tuning in tapered fiber couplers" Applied Optics, vol. 28, No. 19, Oct. 1, 1989, pp. 4226–4233.

D.O. Culverhouse et al., "All Fiber 2x2 Polarization Insensitive Switch", IEEE Photo. Tech. Ltrs., vol. 9, No. 4, Apr. 1997, pp. 455–457.

D.O. Culverhouse et al., "3x3 All–Fiber Routing Switch", IEEE Photo. Tech. Ltrs., vol. 9, No. 3, Mar. 1997, pp. 333–335.

Seok Hyun Yun et al., "Suppression of polarization dependence in a two–mode–fiber acousto–optic device", Optics Ltrs., vol. 21, No. 12, Jun. 15, 1996, pp. 908–910.

X. Steve Yao et al., "Simple in–line method to measure the dispersion of an optical system", Appl. Phys. Lett. 62 (8), Feb. 22, 1993, pp. 811–813.

E. Brinkmeyer et al., "Optical space domain reflectometry (OSDR) for determination of strength & chirp distribution along optical fiber gratings", BSuC2–133–35, Photosensitivity in Glass Meeting, Williamsburg, VA 1997.

S. Barcelos et al., "High accuracy dispersion measurements of chirped fibre gratings", Elect. Ltrs., wol. 31, No. 15, Jul. 20, 1995, pp. 1280–1282.

M.M. Ohn et al., "Arbitrary strain profile measurement within fibre gratings using interferometric Fourier transform technique", Elect. Ltrs., vol. 33, No. 14, Jul. 3, 1997, pp. 1242–1243.

M.A. Muriel et al., "Phase reconstruction from reflectivity in uniform fiber Bragg gratings", Optic Ltrs., vol. 22, No. 2, Jan. 15, 1997, pp. 93–95.

H. Kogelnik, "Filter Response of Nonuniform Almost–Periodic Structures", The Bell System Technical Journal, Jan. 1976, pp. 109–127, vol. 55, No. 1.

M. Volanthen et al., "Measurement of arbitrary strain profiles within fibre gratings", Elect. Ltrs., vol. 32, No. 11, May 23, 1996, pp. 1028–1029.

M. LeBlanc et al., "Distributed strain measurement based on a fiber Bragg grating & its reflection spectrum analysis", Optic Ltrs., vol. 21, No. 17, Sep. 1, 1996, pp. 1405–1407..

R.C. Younquist et al., "Optical coherence–domain reflectometry: a new optical evaluation technique", Optics Ltrs., vol. 12, No. 3, Mar. 1987, pp. 158–160.

* cited by examiner

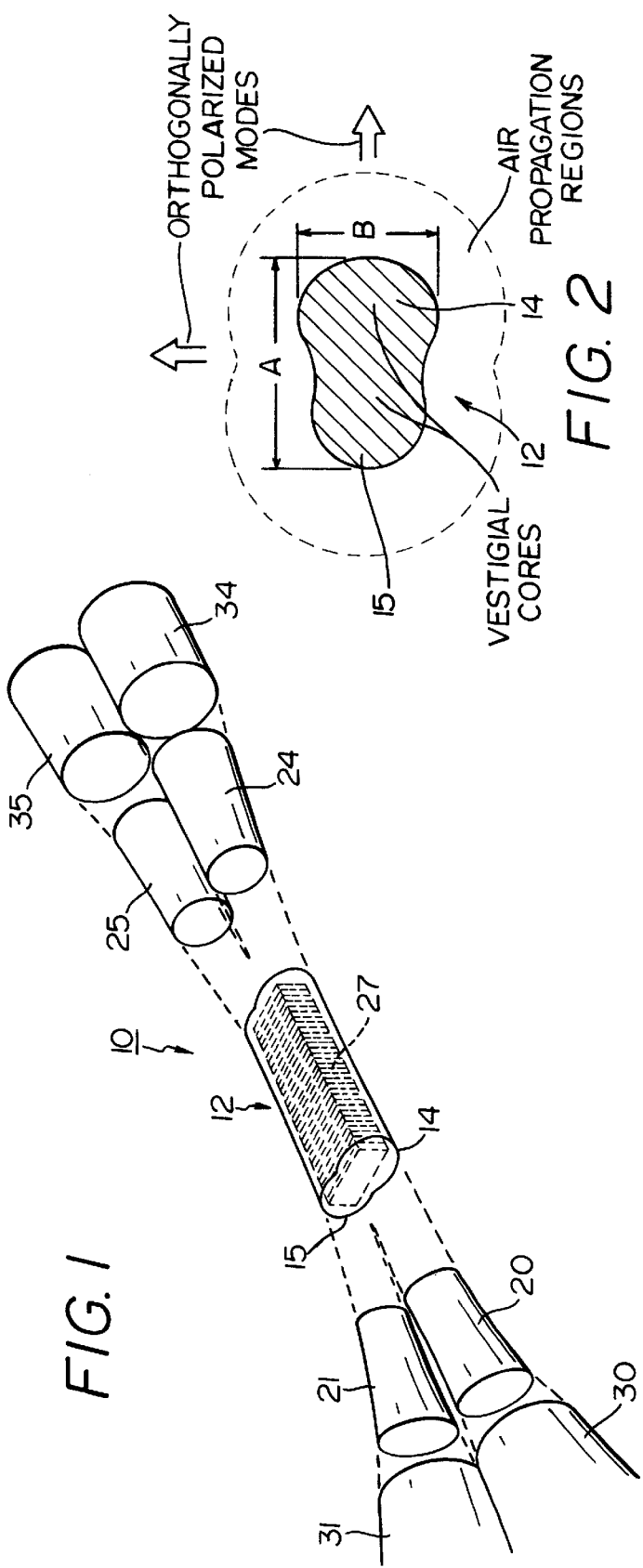

Normalized propagation constants for modes on a dielectric rod $\varepsilon_1=2.26$ in free space with ellipticity $b/a =0.90$: (a) odd modes, (b) even modes. (From [7].)

METHODS OF FABRICATING GRATING ASSISTED COUPLER DEVICES

This application is a C-I-P of application Ser. No. 08/703,357 now U.S. Pat. No. 5,805,751, issued Sep. 8, 1998 entitled "Wavelength Selective Optical Couplers", and filed Aug. 26, 1996, application Ser. No. 08/738,068, now U.S. Pat. No. 5,875,272, issued Feb. 23, 1999 "Wavelength Optical Devices", filed Oct. 25, 1996. This application also relies on U.S. provisional application No. 60/055,157 entitled "Fabrication of Add/Drop Filters for Wavelength Division Multiplexing", filed on Aug. 4, 1997 for priority.

BACKGROUND OF THE INVENTION

This invention relates to optical wave propagation systems and devices utilizing electro-optical devices, and more particularly to grating assisted devices for filtering, coupling and other functions.

Communication systems now increasingly employ optical waveguides (optical fibers) which, because of their high speed, low attenuation and wide bandwidth characteristics, can be used for carrying data, video and voice signals concurrently. An important extension of these communication systems is the use of wavelength division multiplexing, by which a given wavelength band is segmented into separate wavelengths so that multiple traffic can be carried on a single installed line. This extension requires the use of multiplexers and demultiplexers which are capable of dividing the band into given multiples (such as 4, 8, or 16 different wavelengths) which are separate but closely spaced. Adding individual wavelengths to a wideband signal, and extracting a given wavelength from a multi-wavelength signal, require wavelength selective couplers, and this has led to the development of a number of add/drop filters, the common terminology now used for devices of this type.

Since wavelength selectivity is inherent in a Bragg grating, workers in the art have devised a number of grating-assisted devices for adding or extracting a given wavelength with respect to a multi-wavelength signal. Typical optical fibers propagate waves by the use of the light confining and guiding properties of a central core and a surrounding cladding of a lower index of refraction. The wave energy is principally propagated in the core, and a number of add/drop filters or couplers have been developed using Bragg gratings in the core region of one of a pair of parallel, closely adjacent or touching fibers. The coupling region is commonly termed "evanescent" in that a signal propagated along one fiber couples over into the other, as an inherent function of the design. The wavelength selectivity is established by the embedded grating which provides forward or backward transmission of the selected wavelength, depending upon chosen grating, characteristics. For modern communication systems, however, this approach has a number of functional and operative limitations, pertaining to such factors as spectral selectivity, signal-to-noise ratio, grating strength, temperature instability and polarization sensitivity.

The applications referenced above are based upon a novel theoretical concept and practical implementation. A narrow waist region of two fused dissimilar fibers is defined between pairs of tapered coupling sections at each end. At the waist, the merged fibers are formed by elongation of an optical fiber precursor of generally conventional size and are so diametrically small that the central core effectively vanishes. The wave energy is transferred through the merged fiber region in two spatially overlapping, orthogonal modes. Although the propagating energies of the modes overlap, the coupling is essentially non-evanescent except in the presence of a coupling mechanism such as a diffraction grating. For example, a reflective grating written in the waist region redirects only a selected wavelength of an input signal at the input port to the drop port, while all other wavelengths propagate through the waist section without reflection to the throughput port. This reflection grating thus couples light between two optical modes in a non-evanescent manner. Numerous advantages derive from this concept and configuration, but the realization of its full potential is dependent upon other developmental factors.

For example, modern applications require that any add/drop filter based upon this concept be very efficient at routing channels, have a strong grating which can be selectively and precisely placed at or adjusted to a specific wavelength and yet have a limited bandwidth, be temperature insensitive, compact, low cost, and not subject to spurious reflections or noise in the chosen wavelength band. Achieving high drop efficiency and low polarization dependence are particularly important. The problems of achieving these operative properties while at the same time providing a repeatably producible unit of very small size and high sensitivity have required much further innovation.

SUMMARY OF THE INVENTION

In accordance with the invention, the optical properties and performance of a grating assisted asymmetric fused coupler are highly dependent on the physical characteristics of the coupler waist. Polarization insensitivity of the drop wavelength can be achieved, for example, by controlling the shape during elongation or by applying a permanent twist to the coupler waist after the grating exposure. Furthermore, the small diameter waist renders the coupler sensitive to diameter non-uniformities but it is shown that these dimensional variations can be compensated by laser trimming or by impressing a compensated index of refraction grating. Further, the strength of the grating can be dramatically increased by in-diffusing a photosensitizing gas during the grating writing process. For improved spectral characteristics the grating is apodized and unchirped by being written with concurrent grating modulated (a.c.) and uniform (d.c.) intensity UV beams. Size and other characteristics of the waist region are selected such that the drop wavelength of the coupler is adequately separated from the backreflection wavelength and the latter wavelength lies outside the frequency band of interest.

A small coupler having these properties and wavelength adjustability as well is enclosed within a prepackage structure which enables optical access to the coupler waist for grating writing. An elongated structure consisting of materials having different thermal coefficients of expansion is arranged to compensate the temperature dependence of the drop wavelength. Moreover, the structure provides fine tuning so that the drop wavelength is precisely adjusted and subsequently maintained throughout the desired operating temperature range.

Methods and apparatus for writing high strength, precisely defined gratings in very narrow optical fiber structures utilize precision mechanisms and optical subsystems as well as unique processing steps. A merged waist region forming a non-evanescent coupler is first formed in a manner rendering the coupler polarization insensitive. Shape control of a precise nature is achieved by analyzing polarization response during elongation as a traversing flame or $CO_2$ laser beam softens the fibers, and using the measured polarization response to control the heat source in a manner that minimizes polarization sensitivity. Because of the minute diameter of the elongated waist region very small width variations can affect grating uniformity, but this is compensated by varying the background index of refraction. The waist region is rendered photosensitive to impinging UV light by performing all writing operations within a pressurized hydrogen or deuterium environment which assures in-diffusion of photosensitizing gas and replenishes interior gases as the reaction proceeds, maximizing grating strength and uniformity.

To compensate index of refraction variations along the length of the waist region, a test grating is written along the waist and the wavelength response is measured at progressive locations along the waist. In accordance with the readings the background index is varied locally so that a net equalized value exists along the region in which the grating is to be written. During writing the laser beam spot, which is large relative to the waist, is positioned accurately by use of a servo system which adjusts beam position in response to the light transmitted through the fibers. An apodized grating is written in the waist by dividing a scanning laser beam, in accordance with the apodization function, into a periodically varying (i.e. a.c.) beam, and a d.c. beam. These are concurrently directed onto the waist region to create an apodized pattern.

BRIEF DESCRIPTION OF THE DRAWINGS

A better understanding of the invention arises by reference to the following description, taken in conjunction with the accompanying drawings, in which:

FIG. 1 is a simplified and idealized view of the principal parts, namely the tapered coupling branches and the waist region, of a coupler in accordance with the invention, useful in describing the optical waveguide modes and characteristics;

FIG. 2 is an enlarged cross sectional view of the asymmetric waist section of the coupler of FIG. 1, with the extent of the optical wave energy propagating along the waveguide denoted by dotted lines;

FIG. 4 is a simplified and idealized view of a coupler twisted at the waist region to impart polarization independence;

DETAILED DESCRIPTION OF THE INVENTION

Figure 3A:
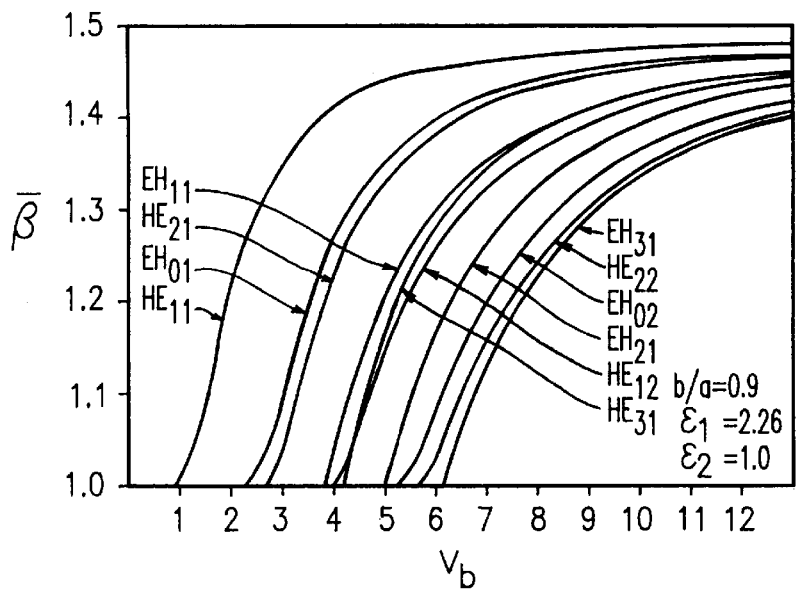
FIG. 3 is a pair of graphs (A) and (B) illustrating the relationship between normalized propagation constants and V number for waveguide configurations employed in these devices, useful in understanding how lossy cladding modes are eliminated, how an adequate separation between drop wavelength and back-reflection wavelength is achieved, and how diameter uniformity tolerances relate to coupler diameter.

An optical fiber wavelength router in accordance with the invention is exemplified by a wavelength selective filter, here of the type usually referred to as an add/drop filter. Such a device, to which multiple channels at different wavelengths are applied, redirects in a low loss, highly efficient manner the selected wavelength channel into a first optical fiber while transferring the remainder of the channels to a second optical fiber. While the concepts employed may be used for other applications, such as switches, multiple channel routers, and crossconnects, the add/drop filter is perhaps of greatest immediate benefit for multiplexers and demultiplexers in wavelength division multiplex (WDM) systems.

FIG. 1 illustrates the physical structure of this device. The fused coupler consists of a first fiber 31, 35 and a second fiber 30, 34 dissimilar in the vicinity of the coupling region 12 wherein an index of refraction grating 27 has been impressed. The two fibers may be made dissimilar by locally pretapering one of them by 20% in the vicinity of the fused region. Light launched into the single mode core of upper fiber 31 evolves adiabatically into an $LP_{11}$ mode with nominal propagation vector $\beta_1$ in the waist, and adiabatically evolves back into the single mode core of the output fiber 35. Light launched into the single mode core of the lower fiber 30 evolves adiabatically into the $LP_{01}$ mode with propagation vector $\beta_2$, and adiabatically evolves back into the single mode core of the output fiber 34. If an index of refraction grating 27 is impressed in the coupler waist 12, and if the wavelength is chosen such that $\beta_1$ and $\beta_2$ satisfy the Bragg law for reflection from an index grating of period $A_g$ at a particular wavelength, say $\lambda_i$:

$$|\beta_1(\lambda_i)| + |\beta_2(\lambda_i)| = \frac{2\pi}{\Lambda_g},$$

then the optical energy at $\lambda_i$ in the single mode core of the first fiber 31 is reflected non-evanescently by the grating into the single mode core of the second fiber 30. The spectral response and efficiency of this reflective and mode-converting coupling process is dictated by the non-evanescent coupling strength of the optical modes with the grating. If the wavelength of the input mode is detuned, say to $\lambda_j$, so that:

$$|\beta_1(\lambda_j)| + |\beta_2(\lambda_j)| \neq \frac{2\pi}{\Lambda_g}$$

then the Bragg law is no longer satisfied and the input mode in the first fiber 31 travels through the coupler waist 12 and reappears as the output mode of the first fiber 35, with minimal leakage into the second fiber 34. For these wavelengths the coupler is transparent; that is, no coupling occurs, and the two fused fibers remain optically independent. Therefore, only a particular wavelength $\lambda_i$ is coupled out of the first fiber 31, 35 as determined by the grating period in the coupling region 12.

Figure 3B:
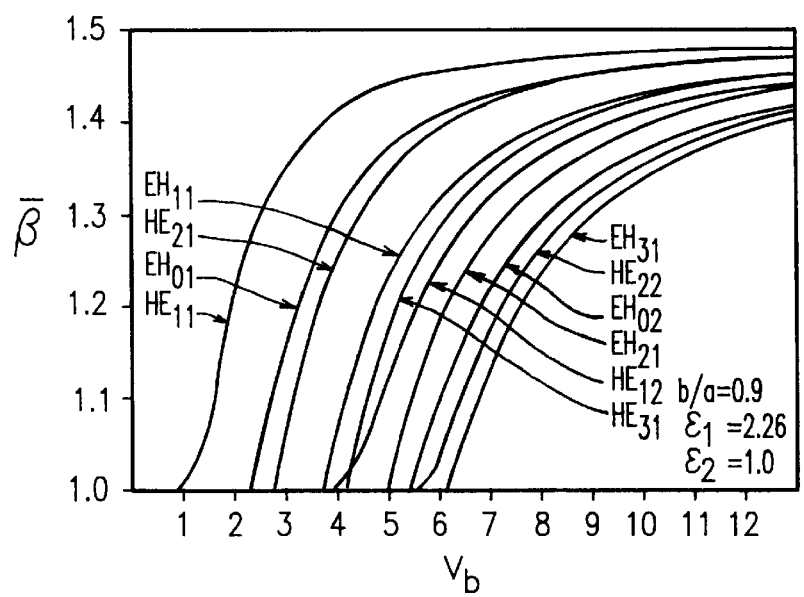

In addition to backwards coupling of light into the adjacent fiber, the grating typically reflects some light back into the original fibers at different wavelengths given by $2|\beta_1(\lambda_2)|=k_g$ and $2|\beta_2(\lambda_3)|=k_g$. To ensure that $\lambda_2$ and $\lambda_3$ are outside the wavelength operating range of interest, the difference between $\beta_1$ and $\beta_2$ is made sufficiently large. The difference increases as the waveguides become more strongly merged or as the fused coupler waist decreases in dimension. This general trend is depicted in FIG. 3, whereby the vertical axis separation between adjacent characteristic curves for eigen-modes of waveguide generally increases for smaller diameters (smaller V's). This difference is maximized for small coupler waists, where $\beta_1$ and $\beta_2$ correspond substantially to the $LP_{01}$ and $LP_{11}$ modes of an air-glass optical waveguide. The $LP_{01}$ mode is a common representation of the $HE_{11}^e$, $HE_{11}^o$ modes, and the $LP_{11}$ mode is a common representation of the $HE_{21}^e$, $HE_{21}^o$, $EH_{01}^e$, and $EH_{01}^o$ modes, illustrated in FIG. 3. It is common in the art to speak in terms of these LP modes in waveguide structures such as coupler waists that do not exhibit circular symmetry.

Furthermore, the tilt angle of the transversely asymmetric grating can be selected to reduce the coupling strength for backreflection of the $LP_{01}$ into $LP_{01}$ modes and the $LP_{11}$ into $LP_{11}$ modes. The other consideration in selecting angle is to maximize the mode conversion efficiency of the $LP_{10}$ into $LP_{11}$ and $LP_{11}$ into $LP_{01}$ modes. The typical angles to minimize backreflection coupling are in the range of 3 to 5 degrees and the angle increases as the coupler waist diameter decreases. This angle is slightly different than the angle to maximize the drop efficiency.

To form this fiber optic coupler, two locally dissimilar fibers are fused to a narrow waist typically 1 to 50 microns in diameter, forming a waveguide in the fused region which supports at least two supermodes or eigenmodes of the composite waveguide. The number of supermodes supported by this composite waveguide structure is determined by the index profile and dimensions of the structure. When this waveguide structure is significantly reduced in diameter, the waveguiding characteristics resemble that of an air-glass waveguide. The mode propagation behavior of this simplified step index waveguide is then partially described by a parameter defined as the V number, which decreases as the radius a of the waveguide core is decreased, and depends on the optical wavelength $\lambda_o$ of the mode, the core index $n_{core}$ and the cladding index $n_{clad}$:

$$V = \frac{2\pi a}{\lambda_o} \sqrt{n_{core}^2 - n_{clad}^2}.$$

For an air-glass waveguide $n_{core}=1.45$ and $n_{clad}=1.0$. For an elliptical cross section waveguide, the first or lowest order mode is nominally $LP_{01}$ and the second mode is nominally $LP_{11}$. Typically, higher order modes exist within the coupler waist, as the total number of modes supported by such a waveguide is $N \approx V^2/2$, which is 8–9 for a 4 micron diameter waist at 1550 nm. However, the two lowest order modes are principally important in the add/drop operation. In general, a lossy peak appears for each higher order mode greater than two. Because the two waveguides are sufficiently dissimilar and the tapered transition region is sufficiently long, the input optical modes traveling along the single mode cores of the original fibers adiabatically evolve into the supermodes of the coupling region. Upon exiting the coupling region, the supermodes will evolve adiabatically back into the original optical modes as the waveguide splits into the two original fibers. Thus, the optical energy passes from the input to the output without being disturbed. A typical fiber asymmetry of $(|\beta_1|-|\beta_2|)/(|\beta_1|+|\beta_2|)=0.005$ and a taper angle of 0.01 radians results in less than 1% in undesired leakage of optical energy from one fiber to the other. To achieve the asymmetry, a pair of identical fibers can be made dissimilar by stretching (adiabatically pretapering) one fiber in a central region. The two fibers are then merged or joined into one waveguide in the coupling region, yet the two fibers behave as if they were optically independent. A grating is next impressed in the coupling region to redirect light at a particular wavelength from one fiber to another. For example, a 125 micron diameter fiber is pretapered by 25%, then elongated and fused to another 125 micron diameter fiber to form a 4.5 micron diameter, 2 cm long waist region with taper lengths of 2 cm. The resulting taper angle is sufficient to produce a low loss, adiabatic taper. For a UV impressed grating period of 0.540 micron, the wavelength of the drop channel of representative devices is in the 1550 nm range.

A suitable starting fiber from which such a coupler may be fabricated is characterized in part by a photosensitive cladding which may be manufactured using known fabrication procedures by doping the cladding region at least partially with a photosensitive species while maintaining the waveguiding properties (i.e., the N.A.) of a standard single mode core fiber. The goal of the deposition processes for use in the present invention is to dope a significant volume fraction of the cladding. The farther the dopant (e.g., Ge) extends out along the radius of the fiber, the more photosensitive the resulting coupler waist will be after the fusion and elongation stages. It is also important that the fiber be doped in a manner that minimizes thermal stress and material property mismatch within the doped cladding.

WDM systems enable multiple wideband signals to be transmitted on a single optical fiber, provided that individual wavelengths can be precisely centered at given values and have narrow bandwidths with high signal-to-noise ratios. These properties must be provided by the add/drop filters, and the concept as disclosed and claimed in the above mentioned applications have special advantages in these respects. However, the technical requirements are so critical, as is described hereafter, that production of units in quantity at low cost without the need for instrumentation, testing and burning-in at each stage, presents formidable challenges.

As described in the previous applications and seen in FIG. 1, the add/drop filter, also referred to as a coupler 10, has a narrow waist 12 formed by elongation from optical fiber precursors. The waist 12, which is in the range of 2–3 cm long, comprises a pair of locally dissimilar, longitudinally merged fibers 14, 15 forming a merged region typically less than 10 microns in cross sectional dimension. Specifically in this example, the waist region 12 is a hybrid dumbbell-ellipsoid in cross-section, here having a major dimension (A) of 10 microns or less and with a minor (B) dimension that provides a 0.82 ratio between the axes. The hybrid dumbbell-ellipsoid (FIG. 2) is a shape having physical characteristics resembling a cross between a dumbbell shape and an ellipsoid. This shape also has a transverse asymmetry best characterized as a "peanut" or "pear" shape. The asymmetry is the result of the initial pretaper. The smaller fiber 15 in the waist 12 is prestretched before elongation and merging so that it is about 20% smaller (in this example), although the relative size can vary within a range of 10–30% or more. Where the facing sides of the fibers 14, 15 are fused and merged they introduce irregularity into the ellipsoid and retain the asymmetry of the original fibers. The waist region 12 is preferably elongated without twist to prevent the loss of the reference plane defining the centers of the original cores, now only vestigial in character. Maintaining this reference plane in the prepackage before exposure is essential to producing the proper grating tilt asymmetry.

Figure 11:
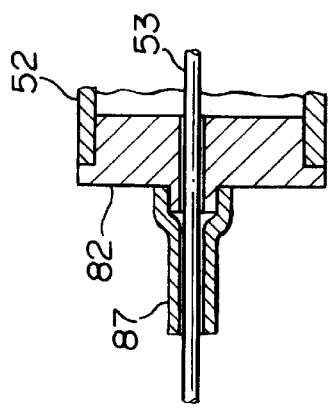
FIG. 11 is a fragmentary side sectional view of an end portion of the coupler, showing the manner in which the coupler housing is hermetically sealed and the exterior fibers are protected.

In preparation of a pair of optical fibers that are to be elongated to form the waist region of a grating-assisted asymmetric coupler in accordance with the invention, one fiber is prestretched so that it is about 20% smaller than the other. Then, as shown generally in FIG. 11, the two fibers 100 are engaged at both ends by clamps 101, 102, which are movable apart at controlled rates by traversing mechanisms 104, 105 under control of a programmed computing system 107. Concurrently, a torch 109 heats the glass of the coupler fibers 100, softening them to allow both elongation and fusion along their lengths. Computer controlled elongation systems of this type are commercially available, and can be employed, with care taken to provide the adiabatic taper of the fiber transitions into the waist region and to provide a sufficiently uniform diameter waist region.

At each end of the waist 12 the fibers extend outwardly in a divergent taper 2–3 cm long along separate tapered coupling branches 20, 21 and 24, 25. This taper is adiabatic and transitions from the small diameter waist region 12 to the much larger single mode optical fibers (not shown) which have diameters of the order of 90–125 microns. These fibers have metalized outer surfaces (not shown) suitable for soldering the coupler to the prepackage and precisely and stably maintaining coupler tension after final packaging. Within the waist region 12, a Bragg grating 27 is recorded that is of selected periodicity suitable for the chosen drop wavelength, and the grating planes are tilted (typically 3°–5°) with respect to the larger of the transverse dimensions of the waist 12. A multi-wavelength input propagating along one branch, e.g., the first tapered coupling branch 21 into the waist region 12 is selectively filtered by the Bragg grating 27, which couples only the drop wavelength into the second tapered coupling branch 20 and the other fiber 30.

In accordance with the invention, the modal relationships, dimensions and properties of the coupler are selected and modified such that a number of advantageous properties are concurrently achieved. Referring now to FIG. 2, the reduced diameter waist sections 14, 15, derived from precursor fibers are doped to be photosensitive (8 mol % germanium is suitable) in the original cladding region surrounding the small higher index of refraction core and have only minute vestigial cores after elongation. Energy is thus confined and propagated in what may be called an air-glass waveguide, the term "air" here meaning the surrounding environment about the physical fiber, whether air or some other medium. Some characteristics of such an air-glass waveguide include a large numerical aperture and multimode waveguiding properties. The radial extent of the field outside the fiber is represented by the dashed line 17.

Within the air-glass waveguiding region of the waist (FIG. 2), the orthogonal optical modes completely occupy and overlap the internal volume of the adjacent fiber 14 or 15, regardless of whether the light originated in fiber 31 or 30. Because of this complete mode overlap, when a grating is impressed within the waist region, the coupling is "non-evanescent", although the modes completely overlap with the grating. Note that the optical mode originally associated with a particular fiber is not localized within that original fiber region in the coupler waist. The modes in the waist are no longer waveguiding in their original fiber material alone.

The air-glass waveguiding property of the coupler waist leads to unique optical characteristics. First, all lossy cladding modes are eliminated. Unlike the precursor optical fiber, whose cladding-air interface also serves as a waveguide, the coupler waist has a new uniform cladding (air) that does not support secondary guiding. The waist supports multiple optical modes, but their number decreases as the diameter decreases. However, a very small waist diameter reduces the number of higher order modes that degrade the short wavelength transmission of this device. These modes are guided in the waist region, yet they escape from the fiber in the adiabatic transition regions of the taper sections and contribute only to background loss at particular wavelengths. In addition, by proper tilt asymmetry of the grating, the coupling strength to these higher order modes can be dramatically reduced or suppressed entirely.

These characteristics become clear upon analyzing the mode diagrams of elliptical cylinders representative of coupler waists, depicted in FIG. 3. Each curve represents one particular mode supported by the waveguide. FIG. 3 [taken from Lewis, J. E. and G. Deshpande, "Modes on elliptical cross-section dielectric tube waveguides", Microwaves, Optics, and Acoustics, Vol. 3, 1979, pp. 147–155] illustrates the normalized propagation constants for modes of a coupler waist with an ellipticity of 0.9 (i.e. greater than the present coupler example of 0.82). The top figure (A) illustrates the odd modes, and the bottom figure (B) illustrates the even modes. The horizontal axis corresponds to the V number of the waveguide, and the vertical axis corresponds to $\beta/\beta_o = n_{\it eff}$, equivalent to the modal index of refraction of the individual optical modes of the waveguide.

The waveguide characteristics may be expressed in terms of different mode expressions. For example, the $LP_{01}$ (linearly polarized) mode is equivalent to a linear combination of the even and odd $HE_{11}$ modes, and the $LP_{11}$ mode is equivalent to a linear combination of the even and odd $HE_{01}$ and $HE_{21}$ modes. LP mode descriptions assist in the analysis of polarization behavior. The mode evolution properties of elliptical waveguides are more amenable to an LP mode description.

The slope of these characteristic curves is a measure of the effective mode index sensitivity to diameter variations. The greater the sensitivity, the greater the chirping or broadening of the Bragg grating due to a given magnitude of diameter non-uniformity. For smaller diameter couplers (smaller V's) the slope increases and the diameter sensitivity increases. That is, smaller diameter couplers have more challenging diameter uniformity requirements to achieve a narrow spectral bandwidth grating. In addition, the separation between effective index for the $LP_{01}$ and $LP_{11}$ modes increases, corresponding to a larger wavelength separation between the drop and backreflection wavelengths (which can be important, as noted below). The separation between these modes and all the additional higher order modes also increases, ensuring that the lossy peaks associated with coupling to higher order modes are pushed out of the spectral region of interest (e.g., the 1530–1560 erbium doped fiber amplifier (EDFA) window).

Unlike fiber gratings, there are no lossy cladding modes which contribute to losses in grating assisted mode couplers, because the actual cladding material of the coupler (typically air) does not have a secondary waveguide structure which supports additional optical modes. Only the doped silica coupler waist supports optical propagation.

The grating assisted mode coupler reflects light at a particular wavelength from one fiber back into the same fiber (the backreflection), and reflects light at a different wavelength from one fiber into the other (the add/drop). The add/drop response leads to the desired wavelength routing of light from one fiber to another, while the backreflection response is usually undesirable. Therefore, the wavelength at which the backreflection occurs should lie outside the operating wavelength region of the add/drop filter. For example, for dense WDM applications in the 1530 to 1565 wavelength range, the backreflection wavelength should be either below 1530 nm or above 1565 nm, or lie at a wavelength between the active wavelength channels. The backreflection/drop wavelength splitting should be 18 nm or more.

This wavelength splitting is readily achieved by making the waist of the add/drop coupler sufficiently narrow (<7 microns) such that the wavelength of the backreflection is far from the drop wavelength. By fabricating fused couplers with small waists, the difference between the modal propagation constants of the $LP_{01}$ and $LP_{11}$ modes increases. Therefore, the wavelength splitting of the drop and backreflection also increases. This wavelength splitting is in excess of 15 nm for an elliptical cross section waist with a major axis of approximately 3.5 microns using a specialty doped starting fiber. Further reduction in the coupler waist diameter leads to a further increase in wavelength splitting. The exact relationship between waist diameter and wavelength splitting depends strongly on the physical shape and the exact index of refraction profile of the coupler waist. A general rule would be to make the waist smaller than 5 microns. However, the required uniformity of the coupler waist diameter becomes increasingly stringent as the waist diameter decreases; therefore, the waist diameter is usually selected to be that diameter which gives a backreflection/drop wavelength splitting slightly larger than 15 nm. A given add/drop filter has a backreflection peak on either the short (for pretapered fiber input) or long (for non-pretapered fiber input) wavelength side of the drop peak.

For many telecom applications of add/drops, such as multiplexers/demultiplexers, this drop/backreflection wavelength splitting requirement is substantially relaxed to a splitting on the order of a WDM channel spacing (0.8 nm or 1.6 nm, for example). Therefore, larger splittings are not be necessary if the wavelengths are demultiplexed from the fiber in a sequential manner (shorter wavelengths to longer wavelengths, for example). Even though the longer wavelength devices have short wavelength backreflections, those channels at these wavelengths are already extracted from the fiber by the previous add/drops. Thus for these units, this waist diameter may be larger, reducing the diameter uniformity tolerance of the coupler.

For most telecom applications the polarization properties of the coupler are important. Optical fields are vectorial in nature; that is, they have direction. This direction is quantified by the state of polarization of the optical field. The polarization of an optical signal may be linear, circular, elliptical, or unpolarized. Two linearly polarized optical signals are othogonally polarized if the electric field vectors lie perpendicular to one another. For example, the $LP_{01}$ and $LP_{11}$ modes can be substantially polarized along the x and y directions, where x and y are the major and minor axes of an ellipse.

The grating assisted mode coupler can readily exhibit a polarization dependence of the wavelength of light coupled from the input fiber to the drop. This polarization dependence is due to the form birefringence of the coupler waist in the region of the Bragg grating. In general, the modal propagation constants β within the waists of fused couplers, for light in the two orthogonal polarization states, are not equal. Referring to FIG. 4, it can be seen, by referring to the two dotted line peaks, that a wavelength separation exists between the two orthogonally polarized modes under these conditions. However, for certain cross sectional shapes and index of refraction profiles of the waist, the polarization dependence vanishes (i.e., $|\beta LP_{01,x}|+|\beta LP_{11,x}|=|\beta LP_{01,y}|+|\beta LP_{11,y}|$). Note that the left and right sides of this equation are equal, even though individually $|\beta LP_{01,x}|$ is not equal to $|\beta LP_{01,y}|$ and $|\beta LP_{11,x}|$ is not equal to $|\beta LP_{11,y}|$. In fact, counter-intuitively, the polarization dependence of the drop wavelength of a coupler waist of circular cross section does not vanish, because the polarization degeneracy of the $LP_{11}$ mode does not vanish for a circular waveguide (that is, $|\beta LP_{11,x}| \neq |\beta LP_{11,y}|$ for a circular waveguide), while the polarization dependence of the $LP_{01}$ modes does vanish ($|\beta LP_{01,x}|=|\beta LP_{01,y}|$).

Figure 5:
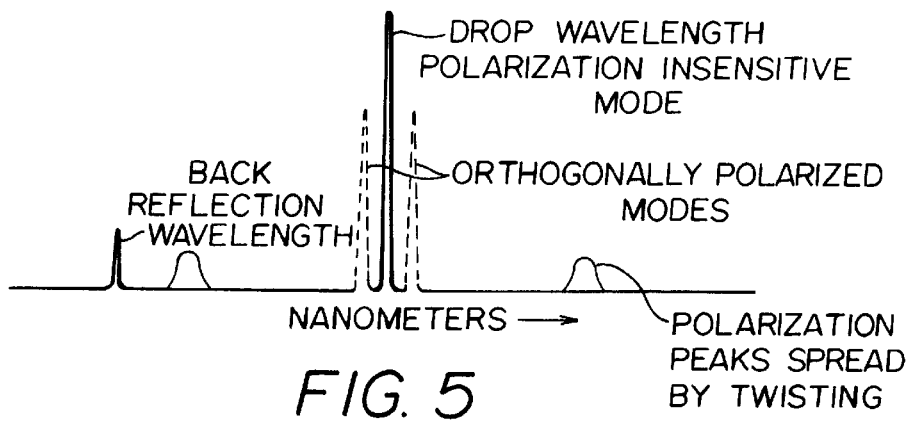
FIG. 5 is a graphical representation of the drop channel spectral characteristics; namely, the drop reflectivity versus wavelength, depicting the effect of twist on the polarization splitting characteristics of the drop channel.

One waist cross sectional shape for which the polarization splitting does vanish at the drop channel is the hybrid dumbbell-ellipsoid with a ratio of minor to major axes of about 0.8. Alternate descriptors include "pear" or "peanut" shaped. Such a waist cross section is achieved when elongating a fused coupler under tension by heating it with a highly controlled and repeatable heat source that is varied in temperature and exposure time to achieve the desired cross section until the monitored polarization characteristics disappear. Examples of suitable heat sources are well known in the art and include $CO_2$ lasers, gas flames and resistive heaters. Alternate waist cross sections have also been designed to eliminate polarization dependence but the hybrid dumbbell-ellipsoid is more readily fabricated. It has been demonstrated that polarization dependence can be reduced to <<0.1 nm by manufacturing the coupler so that its waist has a precise amount of shape asymmetry, as with the preferred elliptical shape. The present add/drop filter has been fabricated in a manner that ensures that the polarization splitting of the add/drop wavelength is less than 0.05 nm. The operation of such a device is then essentially polarization insensitive for gratings of FWHM bandwidth a few times the polarization splitting, or about 0.2 nm. The optical transmission spectra are then independent of the polarization of the input signal. Under such conditions the orthogonally polarized modes merge into the single drop wavelength, as shown in FIG. 5.

Figure 12:
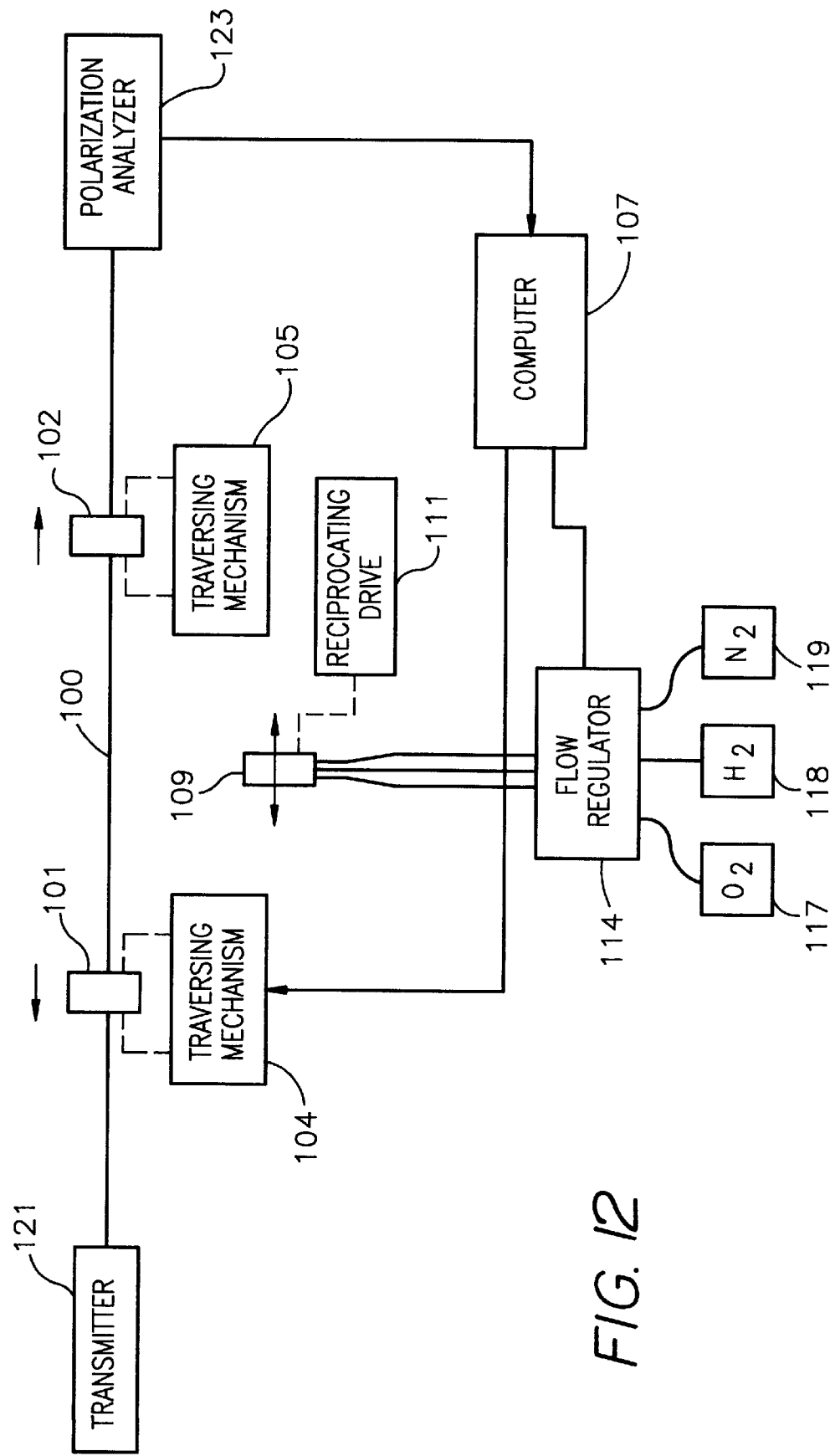
FIG. 12 is a simplified block perspective and block diagram of a system for fabricating a waist region of a coupler while establishing polarization independence.

The coupler workstation (FIG. 12) enables control of the coupler waist cross sectional shape. In this instance, however, the torch 109 is driven in bi-directional fashion by a reciprocating drive 111 under control of the computer 107, and also fed an adjustable mix of gases through computer controlled mass flow controllers 114. In this example, the gases are $H_2$, $O_2$ and $N_2$. By varying the $N_2$ flow while keeping the $H_2$ and $O_2$ flow the same, the regulator 114 can regulate the flame temperature without substantially changing the flame geometrical characteristics.

The objective is not only to draw down to a waist region as the fibers 100 are elongated, but at the same time to shape the fiber cross-section so as to minimize polarization dependence. For this purpose a light source 121 attached to the ends of the fibers 100 sends a light signal through the fibers 100 to a polarization analyzer 123, such as a Hewlett Packard Model 8509B. This instrument monitors the rotation of the polarization in the $LP_{01}$ and $LP_{11}$ modes transmitted through the coupler as it is fused and elongated. This allows the birefringence of the coupler waist to be measured for the two lowest order modes coupled by the grating. The coupler is then fabricated by adjusting heat exposure during elongation so that the birefringence as measured by the polarization analyzer is equal and opposite for the $LP_{01}$ and $LP_{11}$ modes, the condition for polarization independence.

Careful manufacturing process control may be required to repeatedly get the shape of the waist correct. Therefore, an alternative technique which can null polarization dependence of the add/drop device after the coupler has been manufactured can be of practical importance whether used in addition to or separately from the shape control. The grating is first recorded in a coupler, and twist is then applied to the coupler waist until the polarization splitting of the central peak vanishes, as shown in FIG. 4. The coupler is then packaged in this twisted state to preserve the polarization independence. As another alternative, for suitable UV grating writing conditions (e.g., polarization and intensity), polarization dependence can be trimmed out by the UV exposure. The UV exposure process produces material birefringence within the glass that can compensate for the form birefringence of the coupler waist.

One technique to reduce polarization splitting of the coupler utilizes twisting of the coupler waist. Conceptually, the polarization eigenmodes of the coupler waist are linearly polarized. As the coupler is twisted, the polarization eigenmodes become elliptically polarized. In the limit of very large twist they become circularly polarized. The propagation constants for the two orthogonal polarization modes in a twisted coupler waist are given by:

$$\beta_\pm = (\beta_x - \beta_y)/2 \pm \xi \sqrt{1+((\beta_x-\beta_y)/2\xi)}$$

Here $\xi$ is the twist of the coupler in rad/m, and $\beta_x$, $\beta_y$ are the propagation constants of the untwisted coupler waist. The wavelengths of the three peaks in the drop spectrum are determined by the grating phase matching conditions, where $k_g$ is the grating vector:

$$\beta_+(\lambda_1) + \beta_-(\lambda_1) = \beta_-(\lambda_1) + \beta_+(\lambda_1) = k_g$$

$$\beta_+(\lambda_2) + \beta_+(\lambda_2) = k_g$$

$$\beta_-(\lambda_3) + \beta_-(\lambda_3) = k_g$$

Input light polarized along y transforms into the − mode, and is reflected by the grating into a superposition of backwards-propagating + and − modes through the first and third phase matching conditions, respectively, giving rise to two peaks at wavelengths $\lambda_1$ and $\lambda_3$. Input light polarized along x similarly is reflected through the first and second phase-matching conditions at wavelengths $\lambda_1$ and $\lambda_2$. The first phase matching condition, which is common to both input polarizations, gives rise to the central unpolarized peak at $\lambda_1$. The second and third phase matching conditions give rise to the polarized sidebands at $\lambda_2$ and $\lambda_3$.

The generic technique of applying twist to optical waveguides has been used by several researchers to control birefringence, as by Birks (to null the polarization splitting of an acousto-optical switch). Wilkinson (to control the birefringence of a wavelength-division multiplexer made from a biconical taper coupler) and Barlow et al. (to null the birefringence of a singlemode optical fiber). Using twist in this manner to control the birefringence for light that is forward-coupled or simply propagates through the coupler has different requirements than controlling the polarization splitting for backward-coupled light.

A grating can be imprinted by a UV side-writing technique, although the method for producing the grating is unimportant. The coupler is then twisted about the axis of the coupler waist. As this is done, the two drop peaks associated with the two orthogonal polarizations of light within the coupler will be joined by a third peak at their average wavelength. This third peak will show no polarization dependence. As the number of twists is increased, the two polarization peaks will increase their separation and diminish in strength while retaining their polarization dependence, and the central peak will grow to twice the strength of the original polarization peaks. This is depicted generally in FIG. 4.

Arbitrarily large twist will produce arbitrarily large separation and arbitrarily weak strength of the polarization peaks. The maximum amount of twist is determined by the mechanical properties of the glass fiber. The appearance of the central, polarization independent drop peak and two polarization dependent sidebands upon twisting is unique to this reflection-mode add/drop device. In practice, the coupler is twisted until the sidebands are sufficiently weak, after which the coupler is permanently packaged with the given amount of twist.

The response of a reflection grating in a coupler waist is often undesirably "chirped" or spectrally distorted if the diameter of the waist is non-uniform, because the local propagation constants and drop wavelengths vary with changing diameter. Therefore, a grating of constant period within a non-uniform waist will have a broader spectral width than a grating of constant period within a uniform waist. A grating with a 1 Angstrom spectral width requires that the variation in diameter be less than 0.01 microns for a 5 micron cross sectional coupler waist over that region of the waist containing the grating. Similarly, the shape of the coupler should be constant over the region containing the grating to prevent additional chirp and polarization dependence. The grating chirp in the grating response due to small variations in the diameter of the coupler waist is substantially reduced or effectively eliminated, in accordance with the invention, by UV trimming the background d.c. index of refraction within the grating region to compensate in the local modal propagation constants along the waist.

This confronts one of the key issues in the manufacture of a commercially viable add/drop filter based on grating assisted mode couplers. The first is to develop a high yield exposure process to produce narrow bandwidth gratings, such as those required for 100 and 50 GHz WDM systems. A technical hurdle to realize such a device is coupler waist uniformity. Fused coupler waists inherently exhibit slight diameter non-uniformities (typically 100 nm in size) that broaden the gratings by approximately a nanometer for coupler waists 4.5 microns in diameter. To produce 0.1 nm bandwidth gratings requires that non-uniformities lie below 10 nm.

Figure 6:
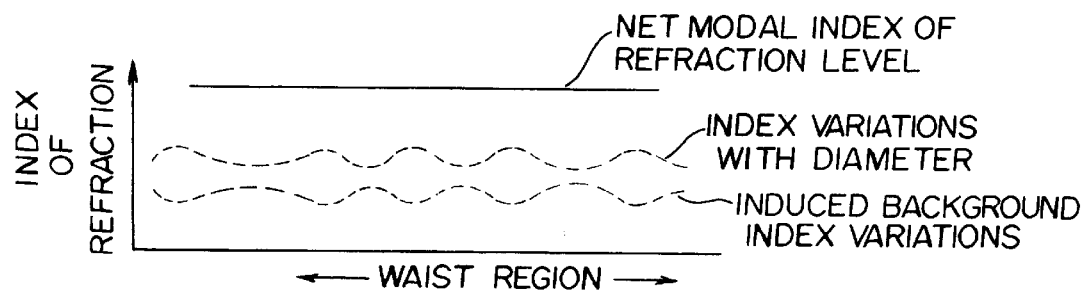
FIG. 6 is an example of effective modal index of refraction variations induced by dimensional variations (top) and the complementary material or background index of refraction variations along the waist region, which cancel or compensate the variations in mode index caused by dimensional variations. This uv trimmed waist depicts how a uniform grating is achieved in a small non-uniform diameter waist region.

In practice it is difficult to reduce the coupler diameter non-uniformities below 50 nm. However, arbitrarily narrow gratings may be produced within non-uniform coupler waists by locally changing the material index of refraction by locally UV trimming or exposing those regions which are smaller in diameter than the largest diameter segment within the region to be exposed. This relationship is depicted generally in FIG. 6. The local modal index of refraction as a function of the distance z along the coupler is a function of the material index of the glass and the waist diameter. To compensate for variations in the waist diameter, the d.c. or background value of the index of refraction is locally tailored by a scanning UV beam to cancel the variation in the modal index. This provides a means for post-processing after fiber elongation to reduce any broadening of the gratings due to diameter non-uniformities.

To determine the non-uniformities of diameter in a manner that can be scaled up to a manufacturable process, they can be directly measured by scanning electron microscopy, atomic force microscopy or by optical means. However, it has been found that a more precise measurement can be based on measuring the local Bragg wavelength of a uniform period but weak test Bragg grating recorded within the non-uniform waist.

In addition to producing uniform gratings within fused couplers, precisely apodized gratings are necessary to reduce grating sidelobes and eliminate adjacent channel crosstalk. Apodized gratings are key to meeting the performance requirements of WDM systems. Apodization is understood to have been achieved by several methods, including variable speed scanning, dithering of the phase mask and apodized phase masks.

An apodized grating can be written by spatially varying the modulation amplitude or a.c. component of the index of refraction in the longitudinal direction along the grating. At the same time, however, the d.c. or background index of refraction must remain extremely uniform (variations less than 0.0001) to prevent undesirable chirp or broadening of the grating. Raised cosine ($\cos^2(z)$), $\sinc^2(z)$, and Gaussian ($\exp-z^2/2\sigma^2$) apodization functions are both effective in reducing the grating sidelobes to below −30 dB. However, the raised cosine is a more efficient apodization shape in terms of reducing the grating exposure length requirements for a given spectral bandwidth.

Figure 7:
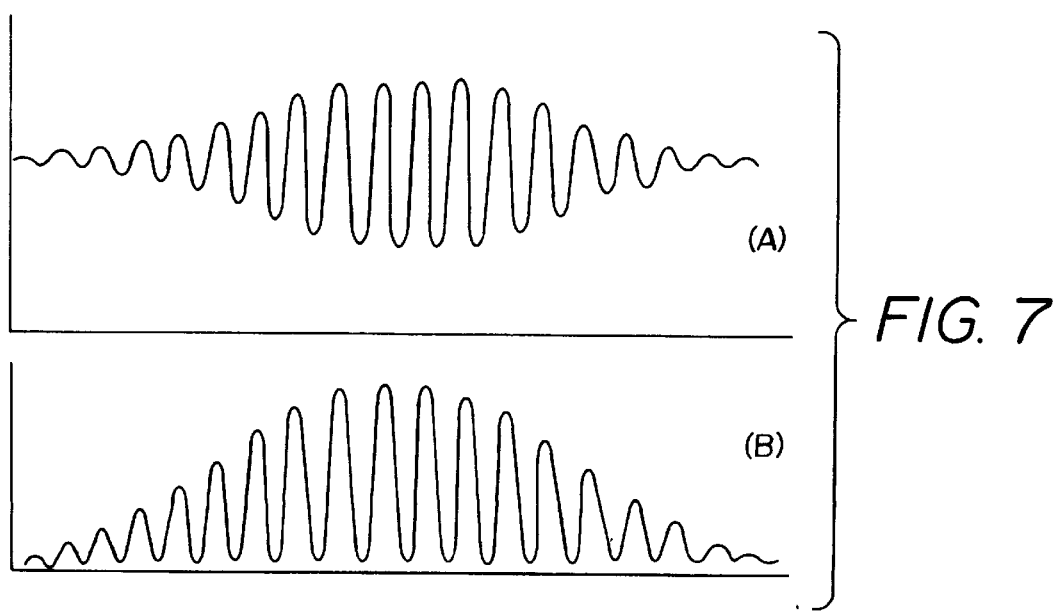
FIGS. 7(A) and 7(B) are illustrative graphs (not to scale) of UV induced index of refraction variations in a coupler corresponding to an apodized grating, such as a cosine-squared or Gaussian apodization function.
Figure 8:
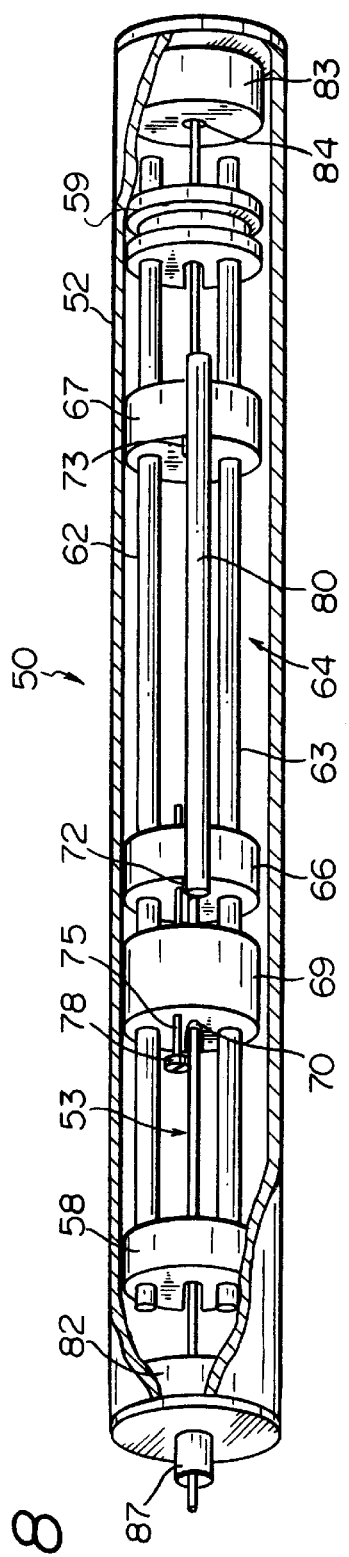
FIG. 8 is a break-away perspective view of an exemplary coupler in accordance with the invention having a cylindrical housing and an interior optical fiber support structure or prepackage.
Figure 9:
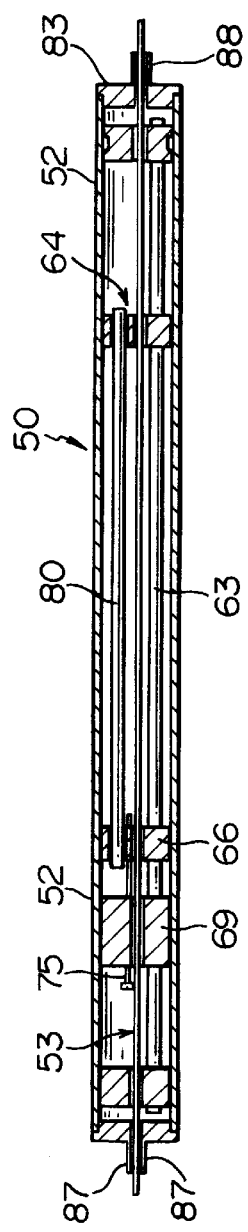
FIG. 9 is a side sectional view of the coupler of FIG. 8.
Figure 10:
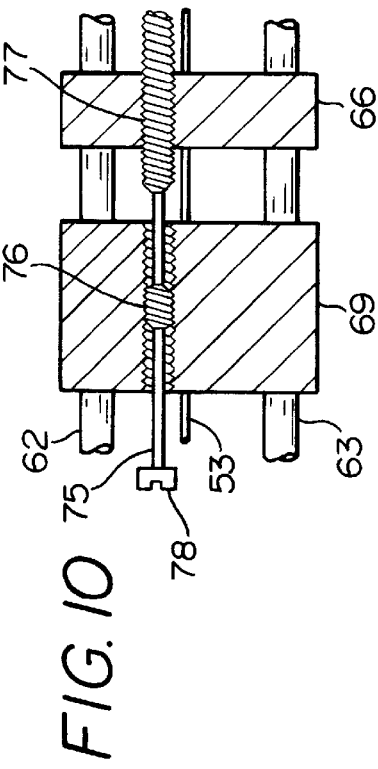
FIG. 10 is a fragmentary side sectional view of a fine tuning mechanism for compensation of wavelength within the coupler of FIGS. 8 and 9.

An apodized grating exhibits a longitudinally varying index of refraction modulation amplitude as well as a uniform period pattern along the waveguide. That is, the grating is gradually (over a large number of grating periods >1000) turned on and then off along the light propagation direction. This smoothly varying window function reduces the spectral ringing or sidebands resulting from gratings with a sharp, rectangle window function. In general, the frequency spectrum of the filter is the Fourier transform of the spatial window function of the filter. A superior method to achieve apodization is to use a scanning exposure, in which the contrast of the optical interference pattern is varied as the grating is recorded while the total incident intensity is contrast. To achieve this, the waist region is simultaneously exposed with a d.c. beam counter-propagating with the modulated a.c. beam while the interference pattern is imprinted. The sum of the intensities of the interference pattern and the uniform beam are kept constant, eliminating undesirable chirp arising from variations in the background index of refraction. As seen in FIG. 7, the index of refraction function for the $\cos^2$ apodized grating is thus an apodized periodic wave varying in bipolar fashion about a center line over a grating length L and is given by:

$$\Delta n(z) = \Delta n_o(z)\left[1 + \sin k_g z \cos^2 \frac{\pi z}{L}\right]$$

The intensity of the a.c. beam is:

$$I(z)=I_o(\sin k_g z+1)\cos^2 \pi z/L$$

and the intensity of the d.c. beam is:

$$I(z)=I_o \sin^2 \pi z/L.$$

Important advantages of the invention also reside in the features included in the example of FIGS. 7–10, to which reference is now made. The add/drop coupler device 50 comprises a cylindrical housing 52 of stainless steel tubing that has a 0.270" OD and a length of 3.67" and what may be termed a "prepackage" or support structure 54 internal to the housing 52. The prepackage structure 54 is inside the housing 52 after assembly but used as a preliminary retainer to hold in the optical fiber coupler 53 precisely during processing steps in which the grating is written and adjustments are made. The prepackage structure 54 extends longitudinally along and within the housing 52, and centrally supports and retains the optical fiber coupler 53, in position along the approximate central axis.

In an initial assembly the opposite ends of the optical fiber coupler 50 are fixed to spaced apart brass end hubs 58, 59 on a pair of parallel invar rods 62,63 that extend along the majority of the inside length of the housing 52. For solderability and freedom from contamination, the hubs 58, 59 and rods 62, 63 are nickel plated, preferably by an electroless process, as are the other elements within the housing 52.

The prepackage structure is completed by interposition between the end hubs 58, 59 of a pair of spaced apart base hubs 66, 67, one of which is proximate to the end hub 59 and is soldered or welded to the first invar rod 62. The other base hub 66, on the second rod 63, is adjacent a reference hub 69 on the first end hub 58 side, also on the second rod 63.

In the prepackage assembly and adjustment phase, there are two subassemblies of rods and hubs, longitudinally slideable relative to each other. One subassembly comprises the first invar rod 62, the first end hub 58 and the second base hub 67, each hub being fixed in position on the rod 62. The other assembly comprises the second invar rod 63, the reference hub 69, the first base hub 66 and the second end hub 59. Engaged in this way, the whole assembly may be mounted in a fitted jig or tray (not shown) with the waist region of the optical coupler 53 being open, for writing of a Bragg grating, to an optical system mounted on the side.

The optical fibers in the coupler 53 diverge from the waist region at each end to where they are fusion spliced to metallized optical fibers of standard dimension. The entire optical coupler 53 extends along the approximate central axis of the housing 52, passing through radial slots 70 provided in each of the hubs 58, 59, 66, 67 and 69. When the prepackage structure 54 is held rigidly in place in its positioning tray, the coupler 53 can then be soldered at its end regions to the central regions of the spaced apart end hubs 58, 59. The waist region is thus stably configured for photosensitization and grating writing steps.

When a grating is written in the waist region with a selected periodicity its drop wavelength must be adjusted to sub-nanometer precision and this wavelength should be essentially constant over the required operating temperature range, normally −35° C. to 85° C. Although invar has a very low temperature coefficient, it alone cannot meet the athermal requirement. The prepackage requirements are that the separation between the end hubs 58, 59 decrease as temperature is increased. This decreases the tension and resulting strain ε within the coupler waist with increasing temperature T is a manner that satisfies the following equation:

$$\frac{\partial \varepsilon}{\partial T} = -\frac{\Lambda_g}{n_{eff}}\frac{\partial n_{eff}}{\partial T} - \frac{\partial \Lambda_g}{\partial T}$$

For Ge-doped silica glasses, the primary contribution to the temperature dependence arises from the first term on the right of the above equation; that is, the temperature dependence of the effective index of refraction $n_{eff}$. The second term on the right, the thermal expansion contribution to the change in grating period, is typically an order of magnitude smaller than the first term.

Note that the base hubs 66, 67 include aligned longitudinal grooves 72, 73 respectively, in their peripheries, and that an adjustment screw 75 extends through the reference hub 69 and the first base hub 66. Consequently, after first adjusting the end hubs 58, 59 to tune the grating, the wavelength is locked in by soldering a stainless steel rod to grooves 72, 73 in the base hubs 66, 67. This inner structure within the prepackage establishes an interior length which has a different thermal coefficient of expansion than the invar rods 62, 63 which are seated at each end but not otherwise spatially defined except through the interior stainless steel connection. Each base hub 66, 67 is coupled to a different invar rod 62 or 63 respectively but has a different spacing along that rod from the end hub 58 or 59 which determines the grating periodicity.

With the stainless steel rod 80 in place, the unit can be inserted into a temperature controlled chamber and cycled through the required temperature range while reading the drop wavelength with optical spectrum analyzer instrumentation. To adjust the drop wavelength so that it is the same at 25° C. as 85° C., the adjustment screw 75 is threaded inwardly or outwardly relative to the reference hub 69. As best seen in the fragmentary view of FIG. 14, the screw has a first short thread 76 mating in the reference hub 69, and a terminal second thread 77 mating in the first base hub 66. By turning the screw 75 at the screw head 78, the screw engagement point with reference hub 69 can be shifted longitudinally, increasing or decreasing the length of one invar segment and increasing or decreasing the length of the stainless steel segment.

When the prepackage structure 54 including the optical coupler 53 is adjusted, it is removed from the holder or tray and inserted into the cylindrical housing 52. The prepackage 54 is fixed in position relative to the housing 52 simply by crimping the housing 52 (see FIG. 7), onto the second end hub 59. End caps 82, 83 with central bores 83 providing openings for the fibers are engaged into the housing 52 open ends, and soldered or welded into place. The outwardly extending fibers at the exit points are soldered to the end cages 82, 83 to produce hermetic seals. Preferably, for longer life, the housing 52 is filled with an inert gas before the housing 52 is sealed. The outwardly extending fibers are protected against kinking and strain by shrink fit tubes 87, 88 of a suitable length.

To reduce the propagation of cracks within the coupler waist and failure of the coupler after packaging, the coupler should be hermetically packaged. The presence of water within the package can lead to coupler failure. This problem is exacerbated when the coupler is packaged under tension, which is necessary to provide a temperature insensitive mount, for example. Preferably, the coupler is packaged either in argon, helium, nitrogen gas or a mixture thereof, or in vacuum.

Obtaining a strong (>99.9% efficiency) Bragg grating in a fiber is materially dependent on the photorefractive properties of the fiber. With a small diameter waist region in the fiber body, particularly one in which a more highly doped core has been stretched to a non-active diameter, the grating is written in what previously would be termed the cladding of the precursor optical fibers. The claddings of typical single mode fiber used to fabricate fused couplers are not doped in a manner providing cladding photosensitivity.

Typical methods disclosed in the prior art to post-photosensitize suitably doped optical fibers to UV illumination are further ineffective for relatively small coupler structures. The waist of a coupler of the present invention is typically only 3–5 microns in diameter and several centimeters long. The waist lies approximately at the center of the fused region of the two starting fibers. If the as-fabricated coupler is subsequently UV exposed in the waist, the drop efficiency is typically less than 50%. To increase the grating strength above 50%, various methods of post-processing the physical coupler structure can be applied; for example, flame brushing or hydrogen loading. However, flame brushing of small, fragile coupler waists easily distorts and bows the fiber under the force of the flame. The abrupt and non-adiabatic bending can lead to loss and failure of the coupler. A superior method to UV photosensitize a coupler waist, referring now to FIG. 13, exposes the coupler waist in a pressurized vessel 130 containing hydrogen and/or deuterium gas. The gas pressure is typically 1000–5000 psi, although if the coupler or gas is heated, for example to 150–300° C., the hydrogen gas will diffuse into the glass very rapidly (<sec) and lower pressures may be equally effective at photosensitization. The fused fiber lengths 130, supported at opposite ends in a holder 134, such as the prepackage structure previously mentioned are illuminated by a laser 136 beam through a window 138 of the chamber 130. The laser beam is directed by a scanning optical system 140 to traverse along the coupler length through a mask 142 which provides the needed periodicity in the written pattern. This is only a generalized depiction, but the principle is applicable whatever type of optical pattern is being implemented.

Figure 13:
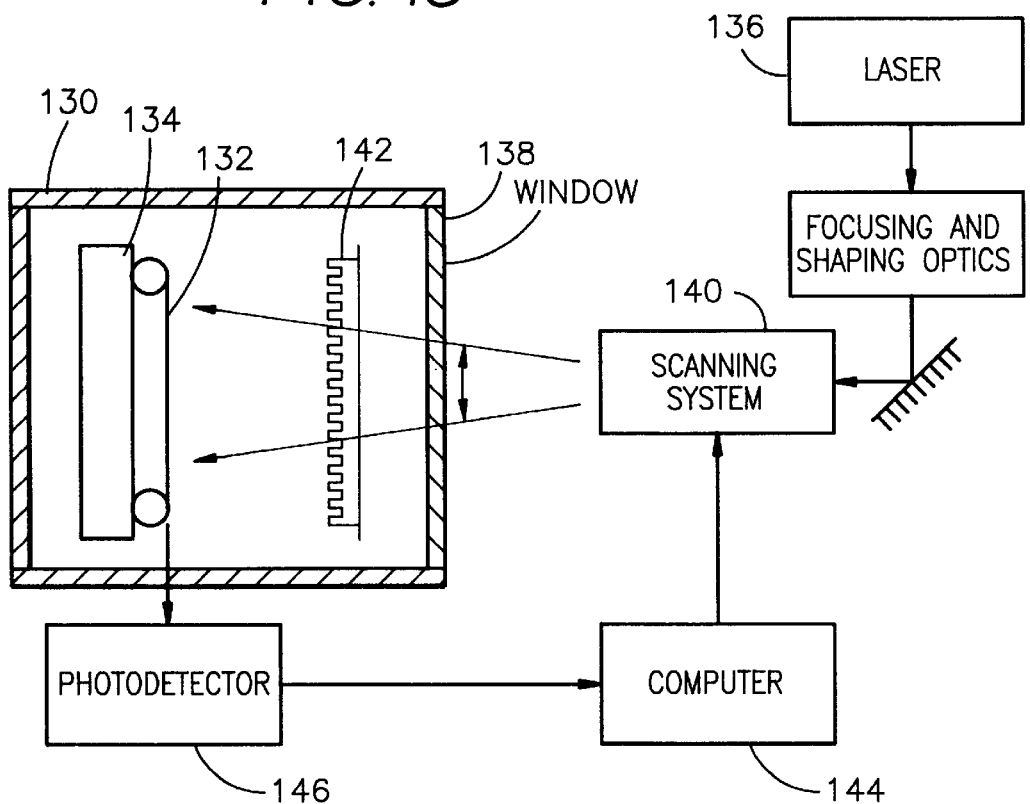
FIG. 13 is a simplified representation of an arrangement for writing high strength gratings.

FIG. 13 also shows, however, an advantageous tracking system used to scan a tightly focused laser beam uniformly along the coupler waist. Focusing and shaping optics form a beam which is of about 20–200 um transverse to the fiber and 200–500 um longitudinal to the fiber. Repeatable positioning of the waist region with the precision that would be needed to overlap with this narrow spot size is not feasible, and additionally the fiber can shift during exposure. Accordingly, an active positioning system implementing a tracking algorithm in the host computer 144 to control a galvanometer driven mirror is used in the scanning system 140. The computer 144 receives the signal from a photodetector 146 responding to 400 nm fluorescence that is generated in the coupler waist by the impinging beam from the laser 136 (here a 100 mW cw frequency doubled argon laser at 244 nm). The tracking algorithm maximizes fluorescence and hence optimizes the laser beam alignment during scanning, so that alignment and movement problems are overcome.

In practice, it is challenging to produce a uniform exposure across the waveguide because of the non-linear nature of the grating exposure process and the large UV induced index changes. The induced index change is a highly sensitive function of the incident intensity and rapidly diverges for small non-uniformities in intensity during the scanning exposure. Intensity variations may be exaggerated further because of the waveguide heating variations that result. These non-uniformities may arise from slight imperfections in the optical transmission of the scanning optics and phase mask, for example. To maintain uniformity of the exposure, a feedback system has been developed which maintains a constant or pre-determined luminescence power for each spatial location along the scan. If the luminescence signal deviates from the desired signal during an individual scan, the feedback system computes the local corrections to the UV incident power necessary to maintain the desired luminescence signal for the next scan pass. An algorithm is developed which maximizes the UV incident power and maintains the desired luminescence signal for each pass. In the case of negligible 400 nm absorption, the desired luminescence signal is a constant value for each pass. The UV power on each pass is modulated by a halfwave plate and polarizing beamsplitter combination, for example, synchronized with the longitudinal scanning motion of the exposing beam along the waveguide. Other well known methods to modulate laser power can also be implemented. This feedback process continues for each scanning pass, and the compensating UV power function is continually updated following each pass. This system has successfully maintained the exposure constant across the grating region to within better than $\Delta n=0.0005$ for a $\Delta n_{total}=0.01$ UV induced index of refraction change. A system to achieve this exposure uniformity is a combination of the scanning exposure system of FIG. 13 and the modulation scheme of FIG. 15, both controlled by a host computer 144.

The waist is exposed in the hydrogen/deuterium-based atmosphere at 1500 psi during the exposure and continually in-diffusing hydrogen/deuterium reacts to form O-H or O-D within the optical fiber as the exposure continues. The hydrogen/deuterium is continually replenished within the coupler waist by continued in-diffusion of gas from the surrounding pressure vessel until the exposure is complete. The rate of diffusion is enhanced by the UV induced heating of the glass; otherwise, an external heat source such as a $CO_2$ laser can be applied. The optimal temperature, dictated by the hydrogen in-diffusion time, the rate of O-H formation during exposure and grating annealing considerations, is in the range of 100–300° C. Thus, the concentration of hydrogen/deuterium gas within the fiber remains at a relatively constant value during the entire exposure, while the amplitude of the periodic modulation of the O-H or O-D concentration continues to increase as the coupler is exposed. UV induced index changes as large as 0.010 can be readily achieved. The short diffusion times unique to the fused coupler waist structure are not counteracted by equally short out-diffusion times to a non-hydrogen atmosphere.

This photosensitization technique has several advantages over earlier fiber grating hydrogen loading techniques. Prior techniques did not expose the fiber while maintaining it within a hydrogen environment; therefore, if these earlier techniques were applied to fused coupler waists, the hydrogen gas would leak out too rapidly before and during exposure to be effective. Typical exposures take in excess of 15 minutes to complete. Second, the simultaneous hydrogen treatment/exposure requires a significantly lower hydrogen pressure than the usual loading techniques. Typically, in the prior art the glass has been loaded to a level such that the hydrogen concentration is of the order of the Germanium dopant concentration in the glass. This requires hydrogen gas partial pressures of 20,000 psi for the high dopant levels typically used. However, by exposing the coupler within a hydrogen/deuterium gas environment, equally large effective O-H or O-D concentrations within the glass at the end of the exposure are achieved even if the gas pressure is an order of magnitude lower.

In the prior art, the glass waveguide is pretreated with hydrogen or deuterium gas, and is removed from the pressure vessel and then subsequently exposed outside the pressure vessel. This pretreatment process is not optimal for treating fused coupler waists. Once the coupler is loaded and removed from the high pressure hydrogen chamber at room temperature, gas rapidly escapes from the 3–5 micron diameter waist. In less than 30 minutes, more than 95% of the hydrogen has escaped from the center of the waist. To compound this problem, the waist may heat up significantly (>100° C.) during the subsequent UV exposure. At these temperatures, hydrogen gas out-diffuses from the waist in a matter of seconds. Since grating recording typically takes at least tens of seconds, most of the hydrogen escapes before the exposure is complete. Therefore, this hydrogen loading technique is not preferred for recording strong UV index of refraction gratings in narrow coupler waists. However, the technique has been improved by cooling the coupler waist, both prior to and during the exposure. A temperature in the range of <0° C. significantly limits out-gassing during the exposure stage.

Figure 14:
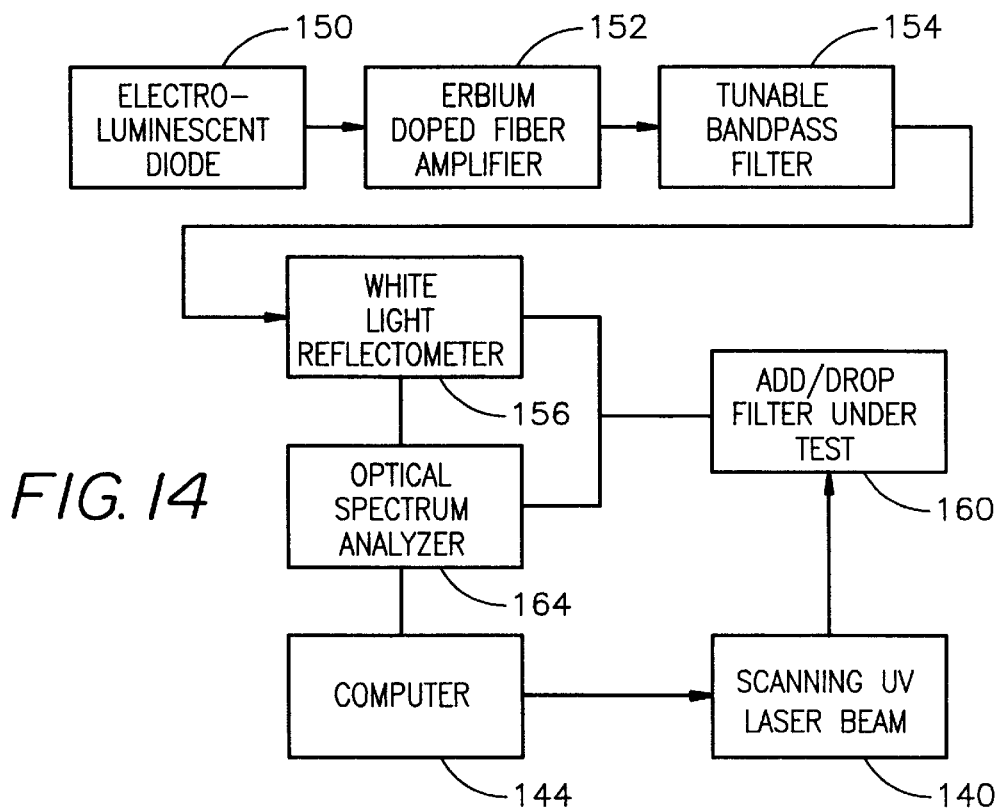
FIG. 14 is a block diagram of an instrumentation and scanning system for compensating for diameter variations in the waist region of a coupler.

As discussed above, a very narrow waist region can have minor width variations which profoundly affect the spectral properties of the index of refraction grating. Spectral properties such as the drop wavelength, filter bandwidth, sideband suppression and crosstalk level greatly impact the systems applications of these filters. These width variations in couplers are effectively neutralized by a compensating approach, instrumentation for which is shown in FIG. 14. The technique of measuring the local periodicity utilizes optical coherence domain reflectometry (OCDR). It is related to a measurement system utilized to measure temperature and strain profiles for fiber Bragg grating sensors.

The experimental setup to achieve such a measurement is shown in FIG. 14. The light source to interrogate the add/drop filter is a broadband electroluminescent diode (ELED) 150 of 30 nm spectral width about 1550 nm amplified by an erbium doped fiber amplifier (EDFA) 152. This broadband light is next spectrally filtered by a tunable bandpass filter 154 of 3 nm spectral width. This light is input into a optical coherence domain reflectometer 156. The reflectometer consists of a Michelson interferometer with the add/drop filter 160 under test contained in one arm, and the reference arm being of variable optical path length to path length match to different longitudinal regions along the coupler waist in the test port arm. The test port arm includes a three port fiberoptic circulator to launch the drop channel back into the reflectometer. By properly de-tuning the bandpass filter to lie at the short wavelength side of the add/drop filter under test, a measure is taken of the reflectivity vs distance along the grating. Since the filtered and amplified light source 150 is of limited spectral bandwidth, the reflectivity signal on the reflectometer 150 is non-zero only for those grating regions that have a Bragg wavelength coinciding with the reference filter. If the reference filter is just overlapping the short wavelength side of the grating in the filter 160, those grating regions not exhibiting a reflection require an increase in the local effective index of refraction. This measurement is used to position a laser 162 beam (Coherent Innova FRED laser) using a scanning and precision translation stage 140 (see FIG. 12) controlled by computer 144 so that the index can be increased by UV radiation in these regions. This trimming is performed in the high pressure hydrogen or deuterium chamber, so significant increases in the index of refraction (0.01) can be produced with a 1 to 100 Joule exposure. Once the reflection dips measured on the reflectometer 156 are eliminated, the background index of refraction has been properly trimmed out to eliminate the spectral broadening arising from diameter non-uniformities. An optical spectrum analyzer 164 simultaneously monitors the grating response to confirm that the non-uniformities are being trimmed out of the grating.

In a particular example, the first stage of the compensation exposure consists of recording a weak, uniform test grating (−10 to −30 dB in strength) in the coupler under fabrication. The grating is next monitored at the test port of an HP8504B precision reflectometer whose internal 1550 nm ELED source is spectrally filtered by a Micron Optics Inc. 3 nm FWHM tunable Fabry-Perot filter and amplified by an Optigain EDFA Power Amplifier and inputted back into the precision reflectometer external light source input. The spectral features of the light input into the device under test is simultaneously monitored on an HP71450B optical spectrum amplifier to determine the local Bragg wavelength of the grating. The variations in local Bragg wavelength arise because of coupler waist non-uniformities. A computer analyzes the reflectometer data and filter wavelength to determine the diameter non-uniformities and automatically trims the local d.c. index of refraction along the coupler waist region containing the grating. This trimming enables narrow band, low crosstalk add/drop filters to be produced in imperfect fused couplers.

In an alternate example of UV trimming, a map of the local drop wavelength as a function of position along the coupler can be produced by processing the reflectometer and filter spectral data. From this data, the coupler can be exposed point-by-point using a scanning exposure system, for example, to correct for diameter non-uniformities along the entire longitudinal extent of the grating. The goal of the correction procedure is to prepare a region of the coupler so that the local drop wavelength is substantially constant along the region. Alternately, a substantially uniform diameter region may be identified that does not require trimming followed by recording of a strong grating. Either trimming approach works best for weak test gratings (<10%). Strong gratings exhibit "pump depletion" and multiple reflections within the grating region, both of which degrade the accuracy of the measurement system. These strong gratings arise from first order diffraction from the index of refraction grating. Alternately, the weaker second order diffraction arising from the $\Delta n^2$ contribution to the well known coupled mode equations for diffraction off a thick grating can be monitored. Since the second-order diffraction is inherently weaker, this signal can be used to provide an accurate measurement of uniformity even for gratings which exhibit a strong first-order diffraction.

Figure 15:
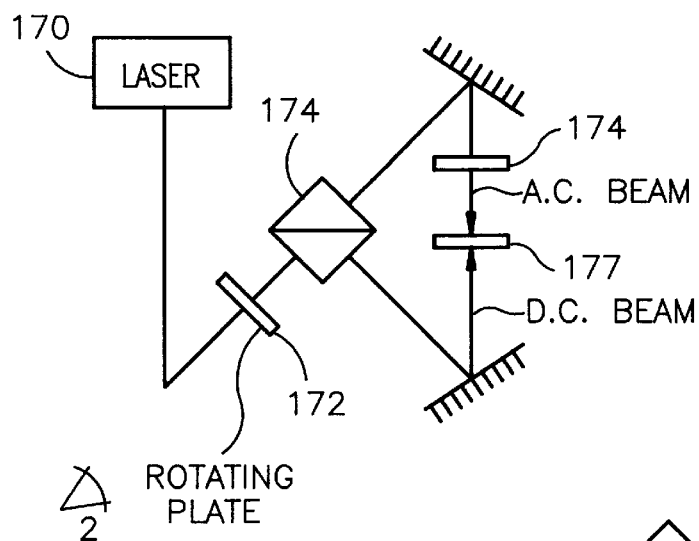
FIG. 15 is a schematic representation of an arrangement for writing an apodized grating using a half-wave plate and polarizing beamsplitter combination.

Once the non-uniformities of the coupler waist are corrected by trimming, a strong $\cos^2$ apodized grating is recorded by simultaneously exposing the coupler waist with a uniform phase mask from one direction (a.c. exposure) and with a uniform beam from the other direction (d.c. exposure) which does not pass through the phase mask. An optical system utilizing a computer controlled, rotating half-wave plate in addition to a polarizing beamsplitter varies the ratio of power between the ac and dc beams as the illumination spot is scanned across the fiber. However, the total power incident on the fiber is independent of this ratio and is constant, ensuring that the process of apodization does not induce grating chirp. The final add/drop has a channel rejection of >40 dB, a bandwidth of several Angstroms, an apodized wavelength spectrum, and exhibits a background loss of less than 0.2 dB. A workstation to produce such apodized gratings is illustrated in FIG. 15. The polarization of the exposure beam from a laser 170 is varied by a rotating half-wave plate 172 that rotates a linearly polarized beam by two times the angle θ between the incident polarization and the fast axis of the half-wave plate 172. A polarizing beam splitter (PBS) 174 then splits the incident beam into two orthogonally polarized beams traveling along different optical paths. The a.c. beam illuminates a phase mask 176 to produce the modulated grating exposure, and the uniform d.c. beam intersects the fiber directly. The ratio of power in the a.c. and d.c. beams is varied according to $I_{ac}/I_{dc}=\cos^2(2\theta)$, while the total power $I_{ac}+I_{dc}$ remains constant. By linearly varying the angle θ from 0 to π/4 as the grating exposure is scanned along the length of the fiber, a $\cos^2$ apodization is automatically produced. Note that this technique may be applied to both coupler gratings and fiber gratings.

Figure 16:
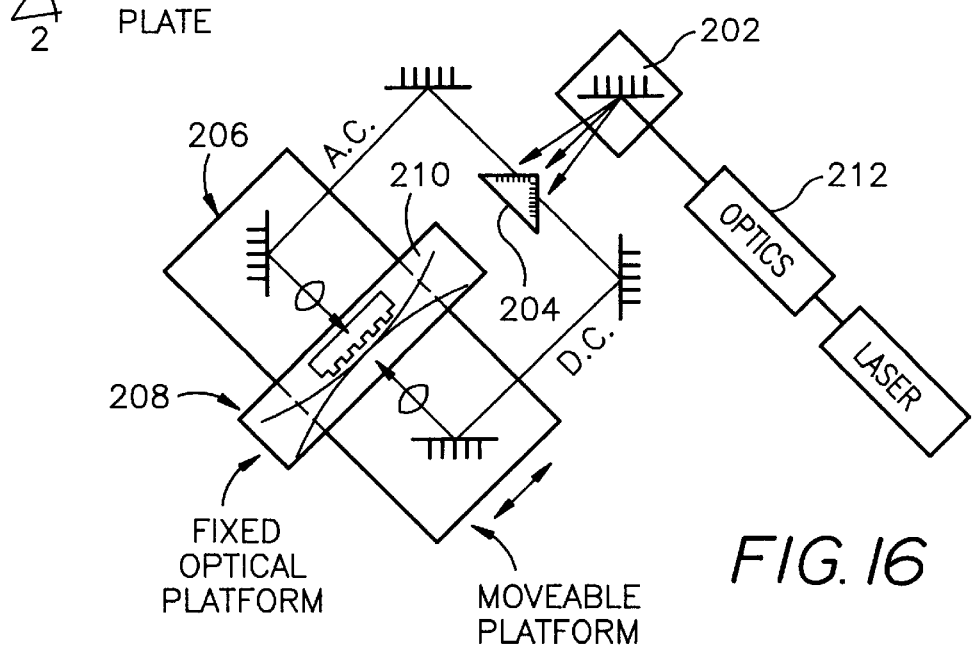
FIG. 16 is a schematic representation of an arrangement for writing an apodized grating using a toggling scanner of varying duty cycle.

An alternate apodization approach uses a scanner to toggle a constant intensity beam rapidly between the a.c. and d.c. arms. Such a system is illustrated in FIG. 16.

Figure 17:
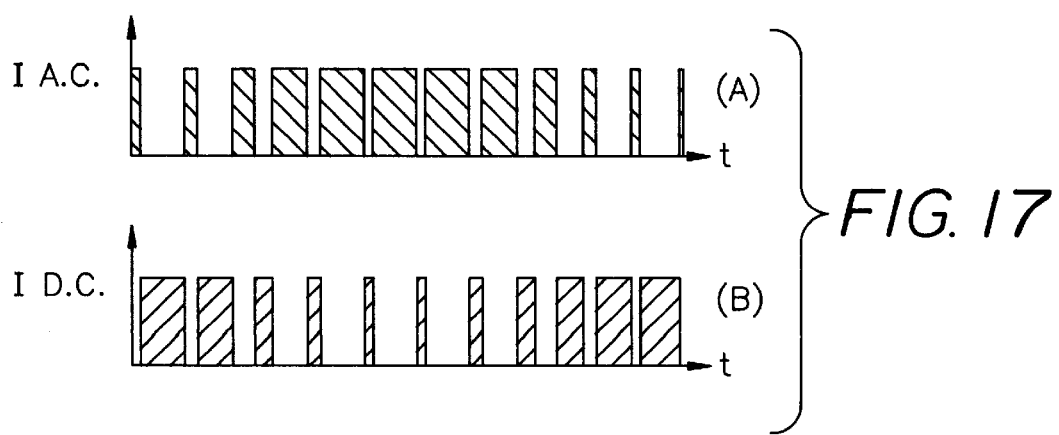
FIG. 17 is a schematic representation of intensity characteristics of (A) a.c. beam and (B) d.c. during beam path toggling with varying duty cycle for a single scanning pass along waveguide.

The input beam from the laser is directed through shaping optics 212 into a controllable deflector or toggling mechanism 202 which alternates the beam so that it angles off different faces of a prism 204, to follow an AC path and a DC path, respectively. In each path corner deflectors and lenses are positioned to direct the beam from opposite directions onto the coupler 210, which is held on a fixed optical platform 208. A grating configured as a phase mask is juxtaposed in the AC path, adjacent the coupler 210 and supported on a movable platform 206 which reciprocates along the length of the coupler 210. The toggling action thus alternates the direction of delivery of light energy on the coupler 210, but the AC component is distributed by the phase mask, depending on its relative position, while the DC component is unaffected. The duty cycle of this toggling (FIG. 17) is varied with longitudinal distance along the grating to control the apodization profile. Toggling of a constant intensity beam (sum of (A) and (B) in FIG. 17) keeps the total intensity constant on the fiber during exposure. This is essential because the local heating of the coupler is dependent on intensity. It is necessary to maintain the temperature locally as the beam is scanned to provide a uniformly exposed and annealed grating region.

Although a number of alternatives and expedients have been shown and mentioned, it will be appreciated that the invention is not limited thereto but encompasses all forms and variations within the scope of the appended claims.

We claim:

1. The method of providing a wavelength selective optical coupler having a narrow bandwidth drop wavelength and high grating strength comprising the steps of:

elongating a portion of one optical fiber pair each having a core and cladding to a narrow waist region in which the fibers are longitudinally merged and the core is vestigial;

tapering optical fiber transitions to and from the waist region adiabatically to a dimension such that the optical modes of original fibers evolve adiabatically into orthogonal modes within the waist region;

modifying the polarization dependence of the propagation constants of the orthogonal modes to establish substantial polarization independence of the drop wavelength in the operation of the coupler;

photosensitizing the waist region;

writing an apodized reflection grating having a periodicity adapted for the drop wavelength in the waist region while maintaining the photosensitization.

2. The method as set forth in claim 1 above, wherein coupling in the waist region is non-evanescent and further including the step of compensating for cross-sectional dimensional variations along the waist region by writing local variations in the material index of refraction of the photosensitized waist region.

3. The method as set forth in claim 1 above, wherein the dimensions of the waist region are sufficiently small to support a limited number of waveguiding modes but not lossy cladding modes.

4. The method as set forth in claim 1 above, wherein the waist region is elongated to be sufficiently small to separate the wavelengths of backreflections from the grating from the drop wavelength and to place the wavelength of backreflections outside the spectral band of interest.

5. The method as set forth in claim 1 above, wherein the step of writing the apodized grating comprises writing both an a.c. component and a d.c. component, such that the index of refraction variation is symmetrical about a base line.

6. The method as set forth in claim 1 above, wherein the coupler operates in a given wavelength band and the elongation step includes reducing the cross-sectional dimensions of the waist region to a size for which the backreflections from the grating are shifted outside the wavelength band.

7. The method as set forth in claim 1 above, wherein the optical fibers have cladding dopant rendering the coupler waist capable of being photosensitized.

8. The method of making a polarization insensitive optical waveguide coupler comprising the steps of:

elongating a pair of optical fibers along a predetermined coupler waist length to form non-circular waists which support an $LP_{01}$ mode and an $LP_{11}$ mode each consisting of two polarizations and propagating along the coupler waist, and adjusting the form birefringence of the coupler waist until the $LP_{01}$ mode birefringence is equal and opposite to the $LP_{11}$ birefringence.

9. A method as set forth in claim 8 above, wherein the birefringences are adjusted by analyzing the rotation of polarization in the two modes of propagation during elongation and shaping the cross sections of the fibers to achieve an equal and opposite angle of polarization rotation for the $LP_{01}$ and $LP_{11}$ modes.

10. A method as set forth in claim 9 above, wherein the two fibers are fused together during elongation and further including the step of shaping the cross sections by heating the waist with a moving flame of variable temperature during elongation.

11. A method as set forth in claim 10 above, wherein the step of shaping the cross section comprises propagating light through the waist during the elongation, measuring the rotation of polarization in the light after passage through the waist, and varying the flame to control the shape of the waist.

12. A method as set forth in claim 11 above, wherein the flame is varied by controlling the flow rate of $N_2$, $H_2$ and $O_2$ gas to control the temperature of the flame.

13. A method as set forth in claim 11 above, wherein the fibers are shaped to a hybrid dumbbell-elliptical cross-section.

14. A method as set forth in claim 13 above, wherein the cross section has a minor to major axis ratio of about 0.8.

15. A method as set forth in claim 10 above, wherein the flame controls the shape of the waist by heating to a temperature sufficient to reduce viscosity of material in the waist such that a dumbbell cross section of two originally fused fibers evolves into a hybrid dumbbell-ellipsoid cross section and wherein heating is reduced upon attaining the desired cross sectional shape to preserve desired polarization properties.

16. The method of making a polarization insensitive optical waveguide coupler comprising the steps of:

elongating a pair of optical fibers to establish a predetermined merged coupler waist length with cross-sectional configurations which support an $LP_{01}$ mode and an $LP_{11}$ mode each consisting of two polarizations and propagating along the coupler waist, and adjusting the uv induced material birefringence of the coupler waist until the $LP_{01}$ mode birefringence is equal and opposite the $LP_{11}$ mode birefringence.

17. A method as set forth in claim 16 above wherein the waveguide coupler has at least one drop wavelength and the fibers are fused together during elongation and wherein the birefringences are adjusted by twisting the waist along its length after fabrication until the drop wavelengths of the LP01 and LP11 modes are substantially polarization independent.

18. A method as set forth in claim 16 above, wherein the waveguide coupler has at least one drop wavelength and the modal propagation constants are equalized such that the polarization dependence of the drop wavelength is less than 0.05 nm.

19. The method of minimizing polarization dependence in a wavelength selective optical waveguide device having a drop channel and propagating orthogonal modes such that the drop channel redirects two orthogonal input polarizations at first and second spaced apart wavelengths, comprising the step of reducing the wavelength differential of the first and second spaced apart wavelengths to reduce the polarization dependence of the device.

20. The method of claim 19 above, wherein the optical waveguide device includes a merged optical fiber waist region including a Bragg grating and wherein the step of reducing the wavelength differential comprises shaping the cross-section of the waist region during fabrication to cause the spaced apart wavelengths to superimpose.

21. The method of claim 19 above, wherein the optical waveguide device includes a merged optical fiber waist region including a Bragg grating and wherein the step of reducing the wavelength differential comprises angularly deforming the waist region about its length to establish a third intermediate and polarization insensitive mode while separating the wavelengths of the polarized modes and reducing their amplitudes.

22. The method of equalizing the local modal propagation constants along a length of optical waveguide that is to include a periodic test grating that comprises the steps of:

locally measuring a center Bragg wavelength of the test grating along the length of grating; and locally varying the material index of refraction along the length of the test grating to minimize variations in the center Bragg wavelength along the grating to <0.5 nm.

23. The method as set forth in claim 22 above, further including the steps of writing a test grating in the optical waveguide, while photosensitizing the optical waveguide by in-diffusing a photosensitizing constituent into the waveguide during the writing of the test grating.

24. The method as set forth in claim 22 above, wherein the step of locally measuring the center Bragg wavelength of the test grating comprises transmitting optical waves into the waveguide and analyzing position and wavelength-varying reflections therefrom.

25. The method as set forth in claim 22 above, wherein the local measurement provides a reading that is representative of the local cross-sectional dimensional variations of the waveguide and wherein the step of locally varying the material index of refraction comprises scanning the waveguide with an ultraviolet beam.

26. The method of providing a narrow bandwidth grating in an optical waveguide device having a merged narrow diameter section reduced to dimensions in which the waveguide core substantially vanishes to a vestigial core which is surrounded by original cladding material and small dimensional variations affect the modal index of refraction, comprising the steps of:

writing a grating in the merged section of the device; and measuring a local Bragg wavelength of the grating along the merged section.

* * * * *